United States Patent [19]

Toyama et al.

[11] Patent Number: 5,204,749

[45] Date of Patent: Apr. 20, 1993

[54] AUTOMATIC FOLLOW-UP FOCUS DETECTING DEVICE AND AUTOMATIC FOLLOW-UP DEVICE

[75] Inventors: Masamichi Toyama, Tokyo; Youichi Iwasaki; Akihiro Fujiwara, both of Kanagawa; Takashi Amikura, Tokyo; Naoya Kaneda; Masahiro Takei, both of Kanagawa, all of Japan

[73] Assignee: Canon Kabushiki Kaisha, Tokyo, Japan

[21] Appl. No.: 860,289

[22] Filed: Mar. 20, 1992

Related U.S. Application Data

[60] Continuation of Ser. No. 701,691, May 14, 1991, which is a division of Ser. No. 569,371, Aug. 14, 1990, Pat. No. 5,031,049, which is a continuation of Ser. No. 483,998, Feb. 22, 1990, which is a continuation of Ser. No. 398,301, Aug. 24, 1989, abandoned, which is a continuation of Ser. No. 315,192, Feb. 23, 1989, which is a continuation of Ser. No. 183,482, Apr. 15, 1988, abandoned, which is a continuation of Ser. No. 737,163, May 23, 1985, abandoned.

[30] Foreign Application Priority Data

| May 25, 1984 | [JP] | Japan | 59-105897 |
|---|---|---|---|
| May 25, 1984 | [JP] | Japan | 59-105898 |
| May 28, 1984 | [JP] | Japan | 59-108188 |
| May 28, 1984 | [JP] | Japan | 59-108189 |
| May 30, 1984 | [JP] | Japan | 59-110515 |
| May 31, 1984 | [JP] | Japan | 59-111962 |
| May 31, 1984 | [JP] | Japan | 59-111963 |
| May 31, 1984 | [JP] | Japan | 59-111964 |
| Jun. 18, 1984 | [JP] | Japan | 59-124891 |
| Jun. 23, 1984 | [JP] | Japan | 59-129517 |
| Jun. 25, 1984 | [JP] | Japan | 59-130679 |
| Jun. 27, 1984 | [JP] | Japan | 59-132441 |

[51] Int. Cl.$^5$ ............................................. H04N 5/232
[52] U.S. Cl. ................................. 358/227; 354/402; 354/430
[58] Field of Search .................... 358/227, 125; 354/400–409; 352/140

[56] References Cited

U.S. PATENT DOCUMENTS

| 4,647,979 | 3/1987 | Urata | 358/227 |
|---|---|---|---|
| 4,719,485 | 1/1988 | Shikaumi | 354/400 |
| 4,762,986 | 8/1988 | Suda et al. | 358/227 |
| 4,872,058 | 10/1989 | Baba et al. | 358/227 |
| 5,023,709 | 6/1991 | Kita et al. | 358/125 |
| 5,031,049 | 7/1991 | Toyama et al. | 358/227 |

*Primary Examiner*—Russell E. Adams
*Attorney, Agent, or Firm*—Anderson Kill Olick & Oshinsky

[57] ABSTRACT

An automatic follow-up focus detecting device comprises means for shiftably setting a follow-up field; extracting means for extracting a feature of an object in relation to the follow-up field; storing means for storing the extracted feature; detecting means for detecting a relative shift between the object and the device on the basis of the feature of the object extracted by the extracting means and the feature stored by the storing means; and shifting means for shifting a distance measuring field following the object according to the relative shift.

16 Claims, 16 Drawing Sheets

F I G.13
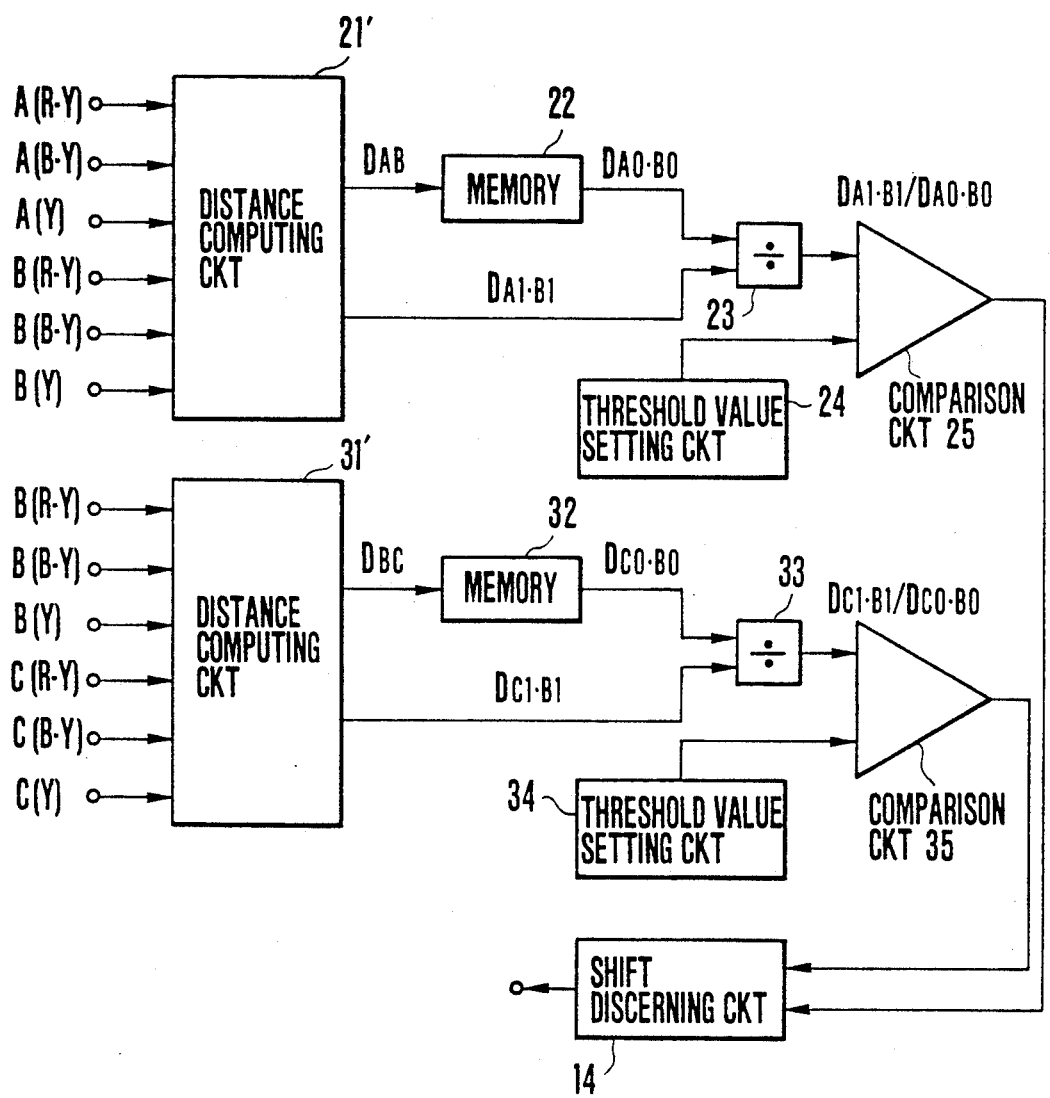

AUTOMATIC FOLLOW-UP FOCUS DETECTING DEVICE AND AUTOMATIC FOLLOW-UP DEVICE

This is a continuation application of Ser. No. 07/701,691, filed May 14, 1991; which in turn is a divisional application of Ser. No. 07/569,371, filed Aug. 14, 1990, now U.S. Pat. No. 5,031,049 which in turn is a continuation of Ser. No. 07/483,998, Feb. 22, 1990; which in turn is a continuation of Ser. No. 07/398,301, filed Aug. 24, 1989, now abandoned; which in turn is a continuation of Ser. No. 07/315,192, filed Feb. 23, 1989; which in turn is a continuation of Ser. No. 07/183,482, filed Apr. 15, 1988, now abandoned; and which in turn is a continuation of Ser. No. 06/737,163, filed May 23, 1985, abandoned.

BACKGROUND OF THE INVENTION

1. Field of the Invention

This invention relates to a device for automatically following a moving object in carrying out focus detection and focus adjustment in a camera and particularly in a video camera.

2. Description of the Prior Art

There have been proposed many automatic focus detecting devices of the kind arranged to use the video signal of a video camera as disclosed, for example, in the specifications of U.S. Pat. No. 2,831,057, Japanese Patent Publications No. SHO 39-5265 and No. SHO 46-17172, etc. These prior art devices employ different methods, which include one method called "a mountain climbing control method". This method was disclosed in an article entitled "Automatic Focus Adjustment of TV Camera by Mountain Climbing Servo Method", by Ishida, et al., appeared in "NHK Technical Researches", Vol. 17, No. 1 (Serial No. 86), p. 21, published 1965. Another method wherein mountain climbing control is employed in combination with a lens which is arranged to be focused by driving the rear lens thereof was disclosed in a technical report entitled "Contour Detecting Automatic Focusing Method", by Hanma, et al. at a conference of a TV Society held Nov. 29, 1983.

Referring to FIG. 1A of the accompanying drawings, the prior art devices of this kind have a distance measuring field fixedly positioned in the middle of a picture taking plane. Therefore, when a main object to be focused on, which in this instance is a person, (hereinafter referred to as the main object) moves, the camera is focused on a wrong object (a house in this instance) instead of the main object as shown in FIG. 1B. Then, the image of the main object becomes a blur. FIGS. 1A, 1B, 2A and 2B represent picture planes obtained with distance measurement performed by a camera which is provided with an automatic focusing device having no parallax.

SUMMARY OF THE INVENTION

A first object of this invention is to provide an automatic follow-up focus detecting device which is capable of obviating the above-stated shortcoming of the prior art devices by automatically detecting the position of a moving object and by shifting a distance measuring field following the movement of the object.

Under this object, an automatic follow-up focus detecting device embodying a first aspect of this invention comprises: Means for shiftably setting a follow-up field; extracting means for extracting a feature of an object in relation to the follow-up field; storing means for storing the extracted feature; detecting means for detecting a relative shift between the object and the device on the basis of the feature of the object newly extracted by the extracting means and the feature stored by the storing means; and shifting means for shifting a distance measuring field following the object according to the relative shift.

A second object of this invention is to provide an automatic follow-up device which is capable of stably performing an accurate follow-up operation with a feature of an object registered by automatically adjusting a follow-up field to the position of the object.

Under this object, an automatic follow-up device embodying a second aspect of this invention comprises: Registering means arranged to shift a follow-up field to a slight extent and to register a feature of the object upon confirmation of that either the whole or a part of the follow-up field come within the followup object; and follow-up means arranged to perform a follow-up operation on the basis of the feature registered by the registering means.

A third object of this invention is to provide an automatic follow-up device which is capable of adjusting a follow-up field to the position of an object without any error even in cases where a signal representing a feature of the object varies to a slight degree.

Under that object, an automatic follow-up device embodying a third aspect of this invention comprises: Means for detecting whether or not the position of a follow-up field and that of an object to be followed up are in agreement with each other under a condition having a preset dead band; means for registering a feature of the object when the position of the follow-up field and that of the object coincide with each other; and means for folowing up the object on the basis of the feature registered by the registering means.

A fourth object of this invention is to provide an automatic follow-up device which is capable of stably shifting a set follow-up field in pursuit of the movement of an object to be followed up.

Under that object, an automatic follow-up device embodying a fourth aspect of this invention comprises: Means for shiftably setting a follow-up field; extracting means for extracting a feature of an object; storing means for storing the feature extracted; means for comparing a feature newly extracted by the extracting means with the feature stored by the storing means and for detecting whether there has arisen any change exceeding a preset threshold value; and means for shifting the follow-up field in the event of any change that exceeds the threshold value.

A fifth object of this invention is to provide an automatic follow-up device which is capable of satisfactorily following up an object, particularly, a person or persons within a scene.

Under that object, an automatic follow-up device embodying a fifth aspect of this invention comprises: Extracting means for extracting from a video signal obtained from within a follow-up field a feature of an object as a color difference signal; storing means for storing the color difference signal; detecting means for detecting a relative shift between the object and the device on the basis of a color difference signal newly extracted by the extracting means and the color difference signal stored in the storing means.

A sixth object of this invention is to provide an automatic follow-up device capable of accurately detecting with simple structural arrangement the direction in which a relative shift between the device and an object takes place.

Under that object, an automatic follow-up device embodying a sixth aspect of this invention comprises: Setting means for setting a follow-up field which is divided into a plurality of regions; extracting means for extracting a signal representative of a feature of an object being followed up from all of or some of the divided regions; and detecting means for detecting a relative shift between the object and the device on the basis of the extracted signal.

A seventh object of this invention is to provide an automatic follow-up device which, in addition to attainment of the above-stated sixth object, is capable of reducing the amount of computation to be performed by computing means in detecting a relative shift between the device and an object to be followed up.

Under that object, an automatic follow-up device embodying a seventh aspect of this invention comprises: Setting means for setting a follow-up field which is divided into at least three regions; extracting means for extracting at least two pairs of difference signals obtained from signals representative of features of an object produced from the divided regions which are adjacent to each other; detecting means for detecting a relative shift between the object and the device on the basis of at least two pairs of the extracted difference signals.

An eighth object of this invention is to provide an automatic follow-up device which is capable of stably performing a follow-up operation without being affected by noises.

Under that object, an automatic follow-up device embodying an eighth aspect of this invention comprises: Extracting means for extracting a signal representing a feature of an object to be followed up; integrating means for integrating the signal extracted; detecting means for detecting a relative shift between the object and the device on the basis of the signal integrated.

A ninth object of this invention is to provide an automatic follow-up device which is provided with follow-up means capable of following up a moving object and particularly an object moving at a high speed.

Under that object, an automatic follow-up device embodying a ninth aspect of this invention comprises: Setting means for setting a follow-up field which is divided into at least three regions; extracting means for extracting at least two sets of difference signals out of difference signals obtained from signals which represent the features of an object and are produced from at least two pairs of adjacent regions including a middle region among the divided regions, with a signal obtained from the middle region fixed to be a signal representing a feature of the object at a specific point of time; and detecting means for detecting a relative shift between the object and the device on the basis of the difference signals.

A tenth object of this invention is to provide an automatic follow-up device which is capable of stably performing a follow-up operation in despite of variations in luminance of illuminating light.

Under that object, an automatic follow-up device embodying a tenth aspect of this invention comprises: Extracting means for extracting color difference and luminance signals representative of a feature of an object to be followed up in relation to a follow-up field; and detecting means for detecting a shift of the object on the basis of a signal obtained by normalizing the color difference signal with the luminance signal.

An eleventh object of this invention is to provide an automatic follow-up device capable of accurately performing a follow-up operation which is prevented from becoming erroneous due to variations in ambient conditions.

Under that object, an automatic follow-up device embodying an eleventh aspect of this invention comprises: Storing means for storing a feature of an object to be followed up; determining means for determining a shift of the object; and renewing means for renewing the stored content of the storing means according to the result of determination when the object has been consecutively determined to be in a stationary state a predetermined number of times.

A twelfth object of the invention is to provide an automatic follow-up device which is capable of always setting a follow-up field in a size apposite to an object despite of variations in distance to the object and the focal length of a picture taking optical system.

Under that object, an automatic follow-up device embodying a twelfth aspect of the invention comprises: First detecting means for detecting a distance to an object; second detecting means for detecting the focal length of a photo-taking optical system; and setting means for setting the size of a follow-up field according to the outputs of the first and second detecting means.

A thirteenth object of this invention is to provide an automatic follow-up device which is capable of setting a follow-up field in an optimum size for an object to be followed up.

Under that object, an automatic follow-up device embodying a thirteenth aspect of this invention comprises: Setting means arranged to permit manual setting of a follow-up field in a variable size; registering means for registering a feature of an object in relation to the follow-up field; and detecting means for detecting a relative shift between the object and the device on the basis of the feature of the follow-up object registered.

A fourteenth object of this invention is to provide an automatic follow-up device which permits the operator to set a follow-up field in an optimum size by carrying out fine adjustment while watching the follow-up field as displayed on a display device.

Under the above-stated object, an automatic follow-up device embodying a fourteenth aspect of the invention comprises: Setting means which permits manual setting of the size of a follow-up field in a variable manner; display means for displaying the follow-up field on a display device; registering means for registering a feature of an object in relation to the follow-up field; and detecting means for detecting a relative shift between the object and the device on the basis of the feature registered by the registering means.

These and further objects, aspects and features of this invention will become apparent from the following detailed description of preferred embodiments thereof taken in connection with the accompanying drawings.

BRIEF DESCRIPTION OF THE DRAWINGS

Referred embodiments of this invention are described by way of example below with reference to the accompanying drawings, in which:

FIG. 13 is a block diagram showing an example of modification on the device of FIG. 11 for carrying out a normalization process by means of a distance computing circuit.

DETAILED DESCRIPTION OF THE PREFERRED EMBODIMENTS

Embodiment I

Figure 1A:
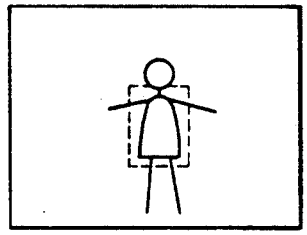
FIGS. 1A and 1B show a relation between the image of an object and the distance measuring field of the conventional camera, FIG. 1A showing an instance where the distance measuring field is in agreement with the object and FIG. 1B showing an instance where the object has moved.
Figure 1B:
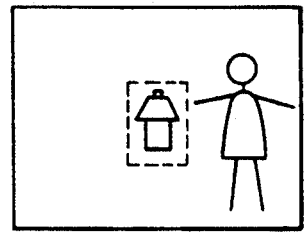
Figure 2A:
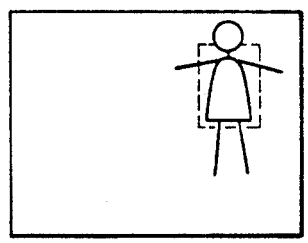
FIGS. 2A and 2B show a relation between the image of the object and the distance measuring field of a camera arranged according to this invention, FIG. 2A showing an instance where the object has moved to another position at the same distance within an image plane and FIG. 2B showing another instance where the object has moved to a position further away from the device within the image plane.
Figure 2B:
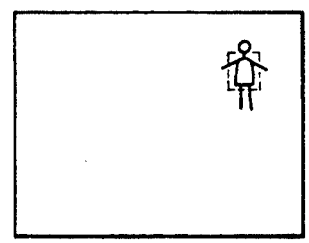

The outline of the automatic follow-up or automatic follow-up focus detecting operation of a first embodiment of this invention is as follows: When a main object (a person) which is in a position within a picture plane as shown in FIG. 1A shifts its position to another position in a right upper part of the same picture plane as shown in FIG. 2A without changing its distance from the distance of the original position, the shift of the object position is automatically detected by follow-up means which will be described later. Then, the distance measuring field of the embodiment is shifted to follow the shift of the object position to obtain a condition as shown in FIG. 2A. The embodiment performs focus detection or focus adjustment with the distance measuring field in the shifted position. More specifically, a parameter representing a feature of the object, such as the color of the object itself and that of the background is extracted in relation to a follow-up field which is set by the above-stated follow-up means. The feature thus extracted is stored. Then, in case that the object moves or has moved, the moving direction or moved position is detected on the basis of the stored feature and a feature of the object newly extracted. With the moving direction or moved position detected, the follow-up field is shifted following the shift of the object. Meanwhile, the distance measuring field is also shifted in the same positional relation according as the follow-up field is shifted. Therefore, FIGS. 2A and 2B may be regarded as showing a relation between the shift of the object and that of the follow-up field. The follow-up field is one of varied means for discerning a shift of an object. Normally, unlike the distance measuring field, the follow-up field is not displayed in the picture plane of the view finder and the object is not observable through the follow-up field. If the follow-up field is to be displayed on the picture plane, one of the follow-up field and the distance measuring field may be larger than the other on the picture plane as they are located in the same position on the picture plane. In the case of FIG. 2A, since the object distance remains unchanged after the shift of the object, the shift of position does not require any adjustment of the focusing lens element within a picture taking lens. Whereas, in the case of FIG. 2B, the object distance also changes while the object position shifts to the right upper position within the picture plane. In this case, therefore, the focusing lens shifts its position according to the result of distance measurement. Therefore, the size of the follow-up field is changed by means of follow-up gate size determining means which will be described later herein. With the size of the follow-up field thus always adjusted to a size suitable for the object, the focus detecting or adjusting operation is carried out under that condition. Since the shift of the object or the camera is relative to each other, the above-stated follow-up operation is effectively performed not only in cases where the object is moving while the camera is fixed but also in cases where the camera is moving while the object is in repose or where both the camera and the object are moving. Further, the size of the follow-up field is adjustable not only when the object distance changes but also when the focal length of the lens changes.

Figure 3A:
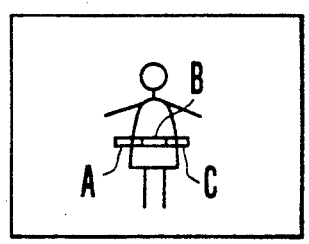
FIG. 3A shows a relation obtained between a followup field and the object in case where the follow-up field is divided in a device embodying this invention.
Figure 4:
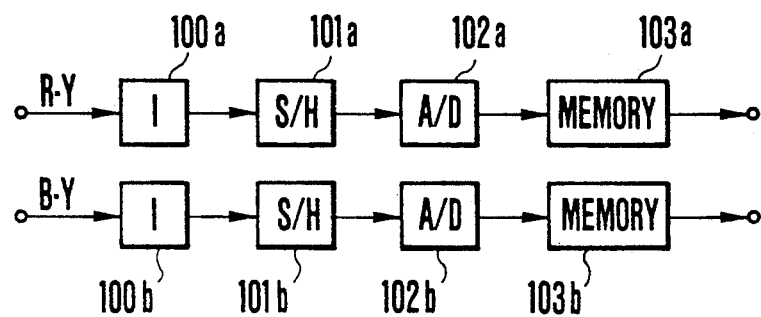
FIG. 4 is a block diagram showing a device arranged to process signals obtained from the divided fields as shown in FIGS. 3A and 3B.
Figure 5:
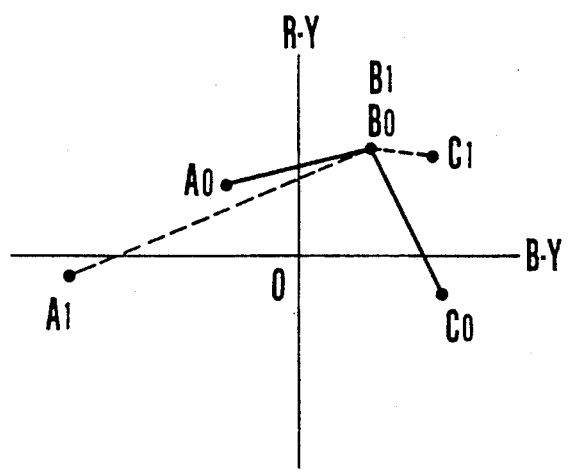
FIG. 5 is a graph showing the signals obtained from the device of FIG. 4 as in a state of plotted on a two dimensional plane.

In general, the follow-up field has a two dimensional spread. However, for the sake of simplification of description, the follow-up field is at first assumed to be one dimensionally extending, as shown in FIG. 3A, before describing it as having the normal two dimensional spread extending in both the horizontal and vertical directions. Further, the follow-up field is assumed to be divided into three parts or regions A, B and C (hereinafter these divided parts will be called picture elements). Color difference signals (R−Y) and (B−Y) are obtained in the form of time series signals from each of these picture elements. Referring now to FIG. 4, these color difference signals are subjected to integration, sample-and-hold and analog-to-digital conversion processes which are carried out by integrating circuits 100a and 100b, sample-and-hold (S/H) circuits 101a and 101b and analog-to-digital (A/D) conversion circuits 102a and 102b. The color difference signals thus processed are stored at memories 103a and 103b. By plotting these stored values on orthogonal axes (R−Y) and (B−Y) for the picture elements A, B and C, they can be expressed, for example, as shown in FIG. 5. Referring to FIG. 5, reference symbols A0, B0 and C0 respectively denote the signals obtained from the picture elements A, B and C of FIG. 3A. Let us assume that, in this case, the picture element B produces a signal representing only the dress of a person which is an object; the picture elements A and C produce a signal obtained by adding up signals representing the dress and the background; and the color of the background of the left side of the object differs from that of the background on the right side of the object. Therefore, the points A0 and C0 are at different positions as color difference signal coordinates.

Figure 3B:
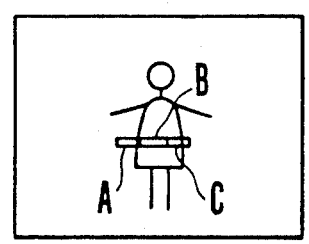
FIG. 3B shows the relation obtained with the object having moved within the image plane of the device.

When the object shown in FIG. 3A moves to the right within the same picture plane as shown in FIG. 3B, the ratio of a portion occupied by the object to a portion occupied by the background within each of the picture elements A and C comes to change. As a result, the signal obtained from the picture elements A and C change as shown at symbols A1 and C1 in FIG. 5. Meanwhile, the picture element B remains within the image of the object as shown in FIG. 3B. Therefore, if the dress or wear of the object is of a single color, the signal from the picture element B does not change. Therefore, assuming that the points representing the signals from the element B are B1=B0 for the sake of simplication, the point C1 is closer to the point B0 (=B1) and the point A1 is farther away from the point B0 (=B1) as shown in FIG. 5. A line segment B1-C1 becomes shorter than a line segment B0-C0 while a line segment A1-B1 is longer than a line segment A0-B0. In case where the line segment B1-C1 is longer than the line segment B0-C0 and the line segment A1-B1 is shorter A0-B0, this indicates that the object has moved to the left in the picture plane of FIG. 3B. In case that the background is in the same color both on the left and right sides of the object, if the object moves to the right in the picture plane of FIG. 3B, the above-stated point A1 comes to a position on a line extending from the line segment A0-B0 while the point C1 comes to a position on the line segment B0-C0. This invention is applicable to both of the cases mentioned above.

Figure 6:
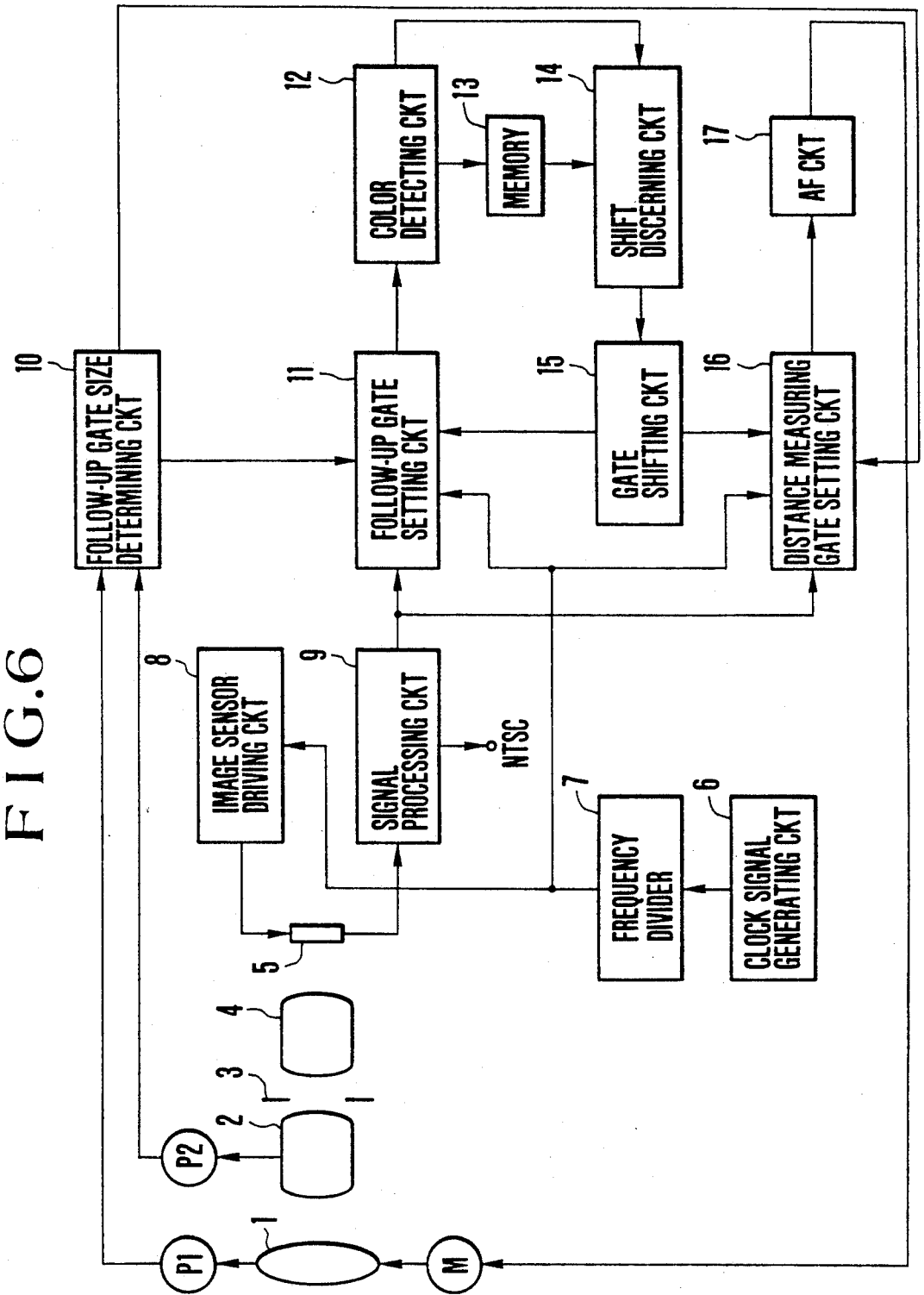
FIG. 6 is a block diagram showing a combination of an optical system and an electric control system arranged in a first embodiment of this invention.

FIG. 6 shows the first embodiment of this invention which is based on the concept described above. Referring to FIG. 6, a picture taking optical system includes a focusing lens 1, a zoom system lens 2, a diaphragm 3 and a relay lens 4. An image of an object is arranged to be received by an image sensor 5 which is, for example a CCD. A clock signal generating circuit 6 is arranged to have its output frequency divided to a desired frequency by means of a frequency divider 7. The frequency divided output is arranged to be applied to an image sensor driving circuit 8, a follow-up gate setting circuit 11 and a distance measurement gate setting circuit 16. The image sensor driving circuit 8 drives the image sensor 5 to cause it to produce a time series image pick-up signal. The output of the image sensor 5 is subjected to necessary synchronization signal composing, modulating and correcting processes through a signal processing circuit 9 and is thus formed into a video signal, such as an NTSC signal. These processes are well known to persons skilled in the art and thus the details of them are omitted from description here. In the following description, the video signal produced from the signal processing circuit 9 is assumed to be an NTSC signal.

At the same time as the NTSC signal, the signal processing circuit 9 supplies color difference signals (R−Y) and (B−Y) to the follow-up gate setting circuit 11 (which is provided for the follow-up field) and the distance measuring gate setting circuit 16. The output of the follow-up gate setting circuit 11 is supplied to a color detecting circuit 12, which detects the color of the object. The detected color of the object is stored at a memory 13, for example, via manual mechanical input means such as a switch (not shown). The color detecting circuit 12 includes the integrating circuit 100, the sample-and-hold circuit 101 and the A/D conversion circuit 102 which are shown in FIG. 4. The above-stated processing operation is performed either in 1/60 sec. which is the one field period of a television signal or according to an average value of several field periods thereof. In the following description, the processing operation is assumed to be performed within one field period or the averaged one field period.

During an ensuing field period, a signal newly extracted and the signal which is stored at the memory 13 are processed at a shift discerning circuit 14. The circuit 14 thus detects whether the object has moved and the moving direction thereof if it has moved. In the event that the object has moved, a gate shifting circuit 15 controls the follow-up gate setting circuit 11 to have the follow-up field shifted accordingly. The same operation (or computation) is then performed during the next field period. The above-stated processing operation is repeated until completion of a follow-up process.

During the operation of the follow-up, the gate shifting circuit 15 causes a distance measuring gate setting circuit 16 to set a distance measuring field in the same relative position as the follow-up field. Then, using a video signal obtained from the distance measuring field (the output of the signal processing circuit 9), an automatic focusing (AF) circuit 17 performs focus detection by a known method such as the mountain climbing control method. A motor M is driven by the output of the automatic focusing circuit 17 to adjust the position of the focusing lens 1.

Again referring to FIG. 6, a position sensor P1 is arranged to detect the absolute position of the focusing lens 1 corresponding to the object distance. Another position sensor P2 is arranged to detect the absolute position of the zoom system lens 2 corresponding to the focal length. Signals produced from these sensors are used by the follow-up gate size determining circuit 10 in controlling the follow-up gate setting circuit 11 and the distance measuring gate setting circuit 16 to have the sizes of the follow-up field and the distance measuring field thus determined.

Assuming that the focal length of the picture taking lens if f; the object distance is R; the dimension of an image sensing surface in the longitudinal direction is y; the length of the follow-up field (the total length of the picture elements A, B and C of FIG. 3A) is l; and the length of the follow-up field covering the object is W and assuming l/y=k, there obtains the following relation:

$$k = \frac{fW}{Ry}$$

Assuming that, in a numerical example, f=30 mm; R=5000 mm; y=8.8 mm, and, assuming that the object being followed up is an adult person, W=500 mm, the value of k becomes: k=0.34.

The value of y is determined by the size of the image sensor, such as a CCD, and that of W by the object. Therefore, a size of the follow-up field apposite to the object can be obtained from the output values of the position sensors P1 and P2 by computing the value k by the follow-up gate size determining circuit 10 in accordance with the formula given above.

Figure 7:
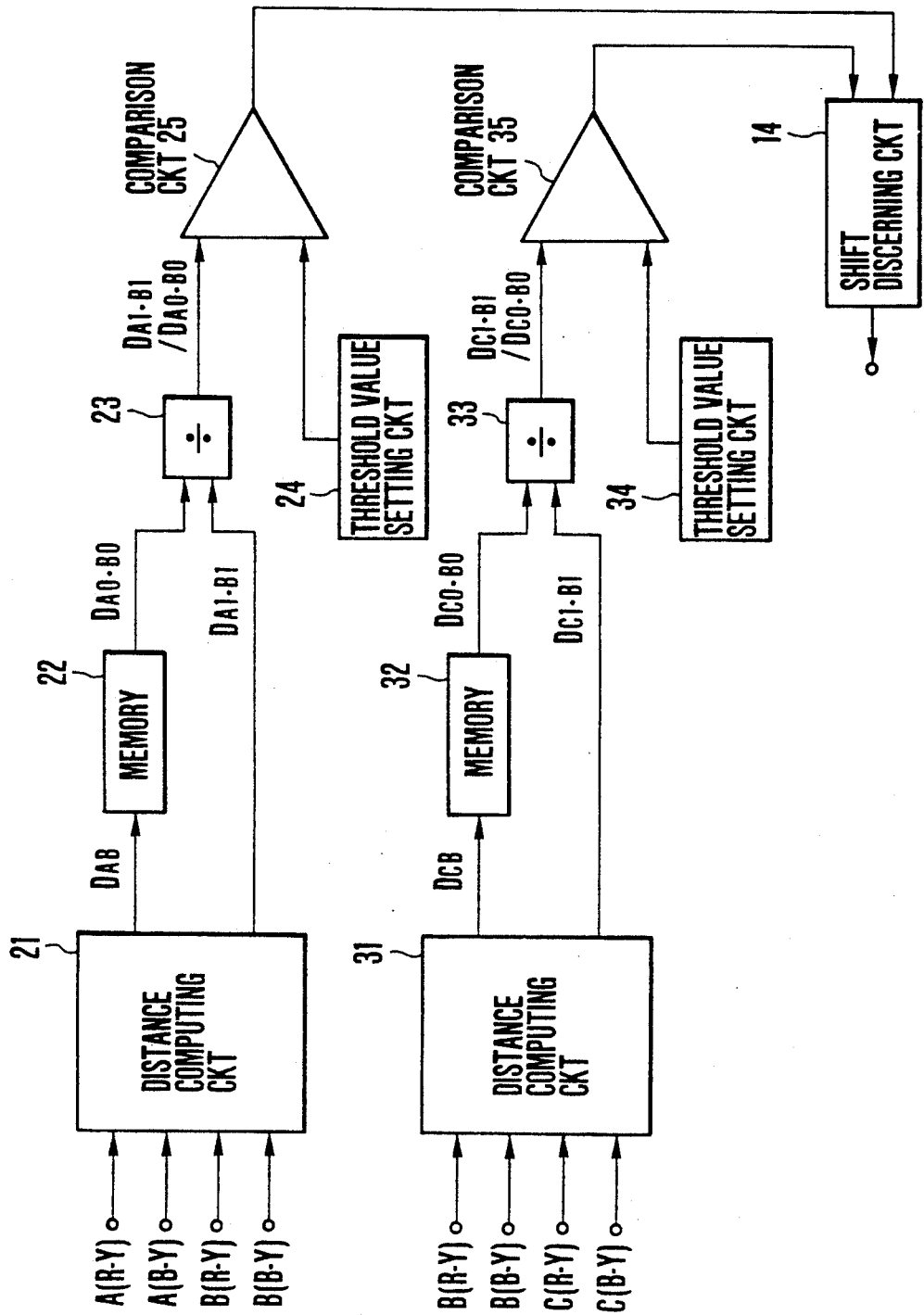
FIG. 7 is a block diagram showing details of the essential parts of the device shown in FIG. 6.

The details of the above-stated color detecting circuit 12, the memory 13 and the shift discerning circuit 14 are as shown in FIG. 7. The signals (R−Y) and (B−Y) of each of the picture elements A and B which have passed through the follow-up gate setting circuit 11 are applied to a distance computing circuit 21. The circuit 21 then gives the length DA0-B0 of the line segment A0-B0 on the coordinate system of signals (R−Y) and (B−Y) shown in FIG. 5. This value is stored at a memory 22. Then, a value DA1-B1 or DA1-B0 is likewise obtained from signals for a next field. Assuming that B1=B0 for the sake of simplification, there obtains a relation DA1-B1=DA1-B0. Then, a divider 23 produces a value DA1-B1/DA0-B0 through computation. This value is compared by a comparison circuit 25 with a first threshold value set by a threshold value setting circuit 24. The comparison circuit 25 produces an output "1" in the event of a change to an extent exceeding the threshold value. Meanwhile, another sequence of circuits from a distance computing circuit 31 to a comparison circuit 35 likewise computes and gives a value DC1−B1/DC0−B0. The comparison circuit 35 likewise produces an output "1" in the event of a change exceeding a second threshold value. In a specific numerical example, with the first and second threshold values both assumed to be 2 under the condition of FIG. 5, the following values are obtained:

$$DA1-B1/DC0-B0=2.2$$

$$DC1-B1/DC0-B0=0.36$$

In this case, the comparison circuit 25 alone produces the output "1". Then, the shift discerning circuit 14 produces a signal for delaying a gate setting timing for a predetermined length of time, which is, for example about 1/125 of one horizontal scanning period in the case of the NTSC color system. Conversely, in case that the comparison circuit 35 alone produces the output "1", the shift discerning circuit 14 produces a signal for quickening the gate setting timing by a predetermined length of time. In the latter case, the object has moved to the left as viewed on FIG. 3A.

The shift discerning circuit 14 thus produces a signal which changes the gate setting timing by a predetermined length of time according to the output "1" of the comparison circuit 25 or 35. In accordance with this signal, the gate shifting circuit 15 controls the gate setting circuits 11 and 16 as mentioned in the foregoing. The gate setting circuits 11 and 16 then shift the follow-up field and the distance measuring field in the shifting direction of the object to permit focus detection to be performed at the shifted position. When necessary, the stored values stored at the memories 22 and 32 may be renewed at the new position of the follow-up field obtained by following the shift of the object, so that the signals can be repeatedly processed in the manner described above. In the specific example shown in FIG. 6, the follow-up gate setting circuit 11 and the distance measuring gate setting circuit 16 are arranged separately from each other. However, in practising this invention, the follow-up gate setting circuit may be omitted and the output of the distance measuring gate setting circuit 16 may be arranged to be supplied to the color detecting circuit 12.

In the embodiment shown in FIGS. 6 and 7, as mentioned in the foregoing, the feature of a main picture taking object is extracted and stored; the feature thus stored is compared with a newly extracted feature of the main object; a shift or no shift in the position of the main object relative to the device is judged from the result of comparison; and, in the event of a shift in the relative position, the distance measuring field is shifted following the shift of the object position. A focus detecting or focus adjusting operation thus can be accomplished by automatically following a moving object to be photographed. In addition to these functions, the embodiment is arranged to have the following function or features:

1) The position sensors P1 and P2 and the follow-up gate size determining circuit 10 are arranged to permit setting of a follow-up field apposite to the object to be photographed even in the event of a change in the object distance or in the focal length of the photo-taking lens. Thus the follow-up can be accurately carried out.

2) The color of the object within the follow-up field is detected. This is then recognized as the position on a two dimensional coordinate system of color difference signals $(R-Y)$ and $(B-Y)$. The shift of the object is detected from variations in the position. Therefore, the follow-up can be satisfactorily accomplished by utilizing a difference in color between a dress or wear and the background in cases where the object is a person. In the case of a video camera in particular, the automatic follow-up device can be simply arranged, without necessitating any change in the video signal processing system thereof, by utilizing the color difference signals which are anyway necessary for video signal processing.

3) The follow-up field is divided into a plurality of regions or picture elements, such as the picture elements A, B and C shown in FIG. 3A. The shifting direction of the object can be detected in a simple manner by processing a video signal obtained from each of these divided regions or picture elements. Further, the required amount of a computation process can be reduced by utilizing a difference signal representing a difference between signals produced from adjoining picture elements. In the case of FIG. 3A, the follow-up field is divided into three picture elements. However, the follow-up field can be divided into any increased number of picture elements. In that instance, depending on the manner in which the object moves, the shift in the position of the object is detectable from color difference signals obtained from some of the picture elements instead of all of the picture elements. Then, the minimum number of such difference signals that must be extracted is two pairs.

4) With the signal from each of the picture elements of the follow-up field subjected to an integration process (circuits 100a and 100b of FIG. 4), the operation of the embodiment can be stabilized without being affected by noises.

5) The threshold value setting circuits 24 and 34 are arranged to allow a follow-up action to be performed only in the event of occurrence of a change in excess of a predetermined value. This permits a stable operation free from any hunting or overshoot. Furthermore, a dead band in the follow-up action can be variable set through adjustment of the threshold value.

6) The values stored at the memories 22 and 32 of FIG. 7 are arranged to be renewable in a repeating manner as necessary according as the position of the follow-up field shifts following the shift of that of the object, so that the processing operation described in the foregoing can be repeatedly accomplished.

Embodiment II

In the preceding embodiment, color difference signal information is used as a parameter indicative of a feature of the object to be photographed; and the signals $(R-Y)$ and $(B-Y)$ representing the features of the picture elements are expressed as positions on rectangular coordinates. However, the coordinate system may be replaced with other coordinates such as polar coordinates. Further, the signals representing the color of the object may be either all of the three primary color signals R, G and B or only some of them. Further, the feature of the object may be extracted by means of a parameter such as luminance signal information or shape information. Such parameters may be used in combination with the color signal information and the shape information combined with each other.

Figure 8:
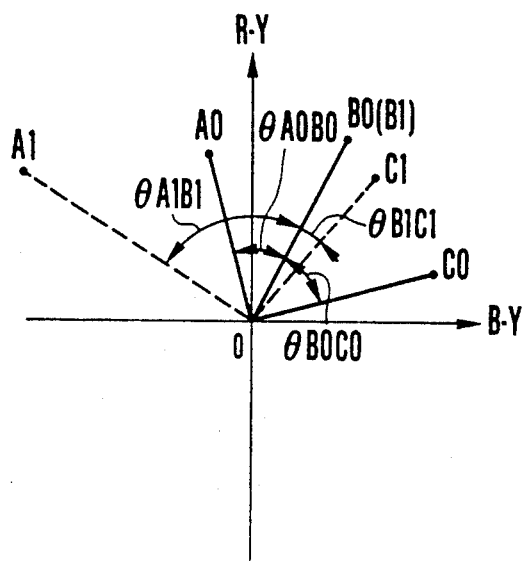
FIG. 8 is an illustration of angular variations of signals obtained from the picture elements of a follow-up field in a second embodiment of this invention, the signals being shown as in a state of plotted on a two dimensional plane.

In detecting a shift in the position of the object to be photographed by means of difference signals representing differences among signals produced from the picture elements A, B and C according as the object moves, a second embodiment of this invention is arranged to perform this operation as follows: Instead of detecting a change in the distances between the positions of the color difference signals of picture elements on the coordinates, i.e. instead of detecting the lengths of line segments A0-B0, A1-B1, C0-B0, C1-B1, etc., the second embodiment performs the shift detecting operation by detecting angular changes of these positions in a manner as shown in FIG. 8. When a person or an object moves to the right within a picture plane, the ratio of an area occupied by the person to an area occupied by the background within each of the picture elements A and C changes accordingly. As a result of this, the signals obtained from the picture elements A and C change as indicated by points A1 and C1 in the drawing. Meanwhile, the picture element B remains within the image of the person. Therefore, if the dress of the person can be regarded as a single color, the signal obtained from the picture element B remains almost completely unchanged. for the sake of simplification of description, points B1 and B0 are assumed to be the same as each other (B1=B0). Therefore, in this instance, the point C1 comes closer to the point B1 (=B0). Meanwhile, the point A1 moves away from the point B1 (=B0). In other words, an angle $\theta$A1-B1 across the origin O becomes larger than an angle $\theta$A0-B0. An angle $\theta$C1-B1 becomes smaller than an angle $\theta$C0-B0. In case that the person moves to the left within the picture plane, the angle $\theta$A1-B1 becomes smaller than the angle $\theta$A0-B0 and the angle $\theta$C1-B1 larger than the angle $\theta$C0-B0.

In detecting a shift in the position of the object by utilizing the above-stated phenomenon, angle computing circuits are arranged in place of the distance computing circuits 21 and 31 which are shown in FIG. 7. The angles $\theta$A1-B1, $\theta$C1-B1, etc. on the coordinate system of the signals $(R-Y)$ and $(B-Y)$ are computed by these angle computing circuits and the following values are obtained from the dividers 23 and 33:

$\theta$A1-B1/$\theta$A0-B0 and $\theta$C1-B1/$\theta$C0-B0

Then, in the same manner as in the case of the preceding example, the comparison circuit 25 or 35 produces an output "1" and supplies it to the shift discerning circuit 14 when either of these values comes to exceed a preset threshold value. In the case of FIG. 8, these values become:

$$\theta A1\text{-}B1/\theta A0\text{-}B0 = 2.2 \text{ and } \theta C1\text{-}B1/\theta C0\text{-}B0 = 0.36$$

In this instance, therefore, the comparison circuit 25 produces an output "1" to indicate that the object has moved to the right in relation to the device. Then, the gate shifting circuit 15 of FIG. 6 causes the follow-up field to shift in the shifting direction of the object or person (or to the right as viewed on FIG. 8). Other functions and operations of this embodiment are identical with those of the preceding embodiment which is arranged to detect a change in distance.

In the embodiments shown in FIGS. 6, 7 and 8, a shift in the position of the photo-taking object being followed up is detected by detecting either a change in distance between the positions representing the signals of the picture elements on the coordinate system of signals $(R-Y)$ and $(B-Y)$, i.e. in the values
DA1-B1 and DC1-B1
or a change in the angular values
$\theta$A1-B1 and $\theta$C1-B1.

The arrangement of these embodiments, permits an adequate follow-up operation on a person within a scenery by a difference in color between the person's dress and the background. Further, in the embodiment described, two color difference signals $(R-Y)$ and $(B-Y)$ are used for detection. However, it is possible to detect the shift of object with only one of the two color difference signals used instead of two of them. The shift detection also can be carried out by using some other kind of information such as a characteristic contrast of the object in combination with such signals.

Embodiment III

In the case of the preceding embodiment, the shift of the object is detected on the basis of the result of computation of the positions of signals of the picture elements A, B, C, etc. on the coordinate plane of $(R-Y)$ and $(B-Y)$. In that case, however, the positions on the system of coordinates would vary even when the object is not moving if the luminance of an illumination light varies with time. In other words, the position comes closer to a zero point according as the illumination light becomes darker and comes farther away from the zero point according as the light becomes brighter. This problem can be solved by extracting a luminance signal in addition to the color difference signals $(R-Y)$ and $(B-Y)$; by dividing the two color difference signals by the luminance signal to normalize them; and by computing the above-stated values DA1-B1/DA0-B0 and DC1-B1/DC0-B0 on the coordinate system of the normalized signals $R-Y/Y$ and $B-Y/Y$. This can be accomplished as follows. For example, the luminance signals A(Y) and B(Y) of the picture elements A and B are supplied to the distance computing circuit 21 of FIG. 7 while the luminance signals B(Y) and C(Y) of the picture elements B and C are supplied to another distance computing circuit 31. Then, values $R-Y/Y$ and $B-Y/Y$ are computed by these two computing circuits.

Figure 9:
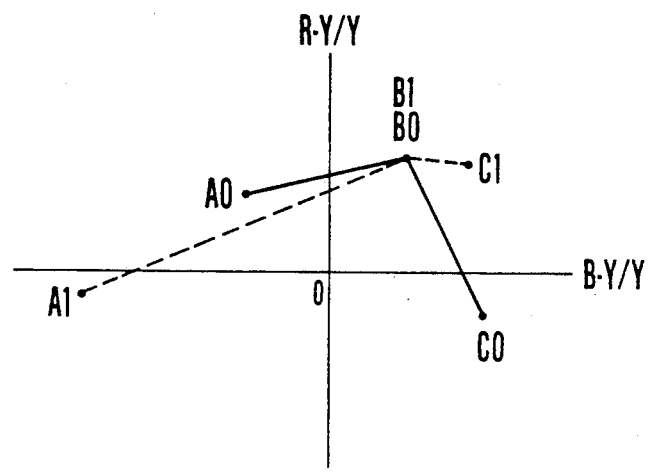
FIG. 9 is a graph showing signals obtained according to a third embodiment of this invention from the picture elements of the follow-up field shown in FIGS. 3A and 3B, these signals being shown as in a state of plotted on a plane of $(R-Y/Y)$ and $(B-Y/Y)$.

More specifically, the color difference signals $(R-Y)$ and $(B-Y)$ and the luminance signals Y are extracted from the picture elements mentioned in the fore-going Then, these signals are processed through an arrangement which will be described later with reference to FIG. 10 to obtain normalized signals by dividing the color difference signals $(R-Y)$ and $(B-Y)$ by the luminance signals Y respectively. The normalized signals thus obtained is stored at memories which will be described later. With the stored signal values plotted on a rectangular coordinate system of values $(R-Y/Y)$ and $(B-Y/Y)$ for each of the picture elements A, B and C, they can be expressed, for example, as shown in FIG. 9. In the case of FIG. 9, the luminance of the illumination light is assumed to be in a standard condition.

A third embodiment of this invention is based on the above-stated concept and is arranged as follows: As a result of a relative shift between the positions of the object and the device, the signals obtained from the picture elements A, B and C respectively shift on the coordinate plane of values $(R-Y/Y)$ and $(B-Y/Y)$ from points A0, B0 and C0 to points A1, B1 and C1. The relative shift of the object is automatically detected by utilizing these changes. Then, the follow-up field is automatically shifted following after the shift of the object according to the result of detection. The reason for detecting the shift of the position of the object by means of the signals obtained by normalizing the color difference signals $(R-Y)$ and $(B-Y)$ is as follows: The purpose of automatic follow-up may be attained by detecting a shift of the object position solely by means of color difference signals. In that case, however, the points on the color difference signal coordinate system might come to change, even when the object position remains unchanged, if the luminance of the illuminating light varies with time. For example, each point on the coordinate system comes closer to a zero point when the illumination light becomes dark and comes farther away from the zero point according as the light becomes brighter. Whereas, in the case of the above-stated arrangement of this embodiment, the luminance signals Y are extracted from the picture elements in addition to the color difference signals $(R-Y)$ and $(B-Y)$ to obtain normalized signals $(R-Y/Y)$ and $(B-Y/Y)$ and the shift of the object position is detected from the changes in the points representing the picture elements and plotted on the rectangular coordinate system of values $(R-Y/Y)$ and $(B-Y.Y)$ as shown in FIG. 9. This arrangement permits stable follow-up by automatically compensating for the variations in the luminance of the illumination light.

Figure 10:
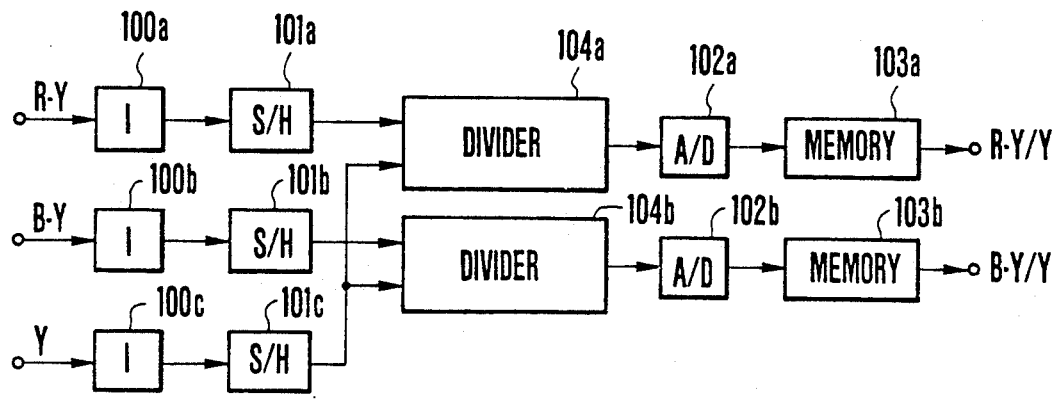
FIG. 10 is a block diagram showing by way of example an arrangement made in the third embodiment of this invention to obtain signals $(R-Y/Y)$ and $(B-Y/Y)$.

FIG. 10 shows by way of example a circuit arranged to obtain the above-stated normalized signals $(R-Y/Y)$ and $(B-Y/Y)$. Referring to FIG. 10, the color difference signals $(R-Y)$ and $(B-Y)$ are integrated respectively by integrating circuits 100a and 100b. The integrated signals thus obtained are sampled and held respectively by sample-and-hold (S/H) circuits 101a and 101b and are then supplied to dividers 104a and 104b. Meanwhile, an incoming luminance signal Y is integrated by another integrating circuit 100c. The integrated luminance signal is then sampled and held at another sample-and-hold circuit 101c and is then supplied to the dividers 104a and 104b. These dividers 104a and 104b then produces the normalized signals $(R-Y/Y)$ and $(B-Y/Y)$ respectively. The normalized signals are A/D converted by A/D conversion circuits 102a and 102b and are then stored at memories 103a and 103b.

In a modification of the above-stated circuit, the A/D conversion circuits 102a and 102b are followed by dividers 104a and 104b; and the sampled and held signal Y is A/D converted before the normalizing process is carried out by the dividers 104a and 104b. In another modification, the dividers 104a and 104b are arranged before the integrating circuits 100a and 100b; and the normalizing process may be carried out by supplying the signals (R−Y) and Y and signals (B−Y) and Y to the dividers 104a and 104b respectively.

Figure 11:
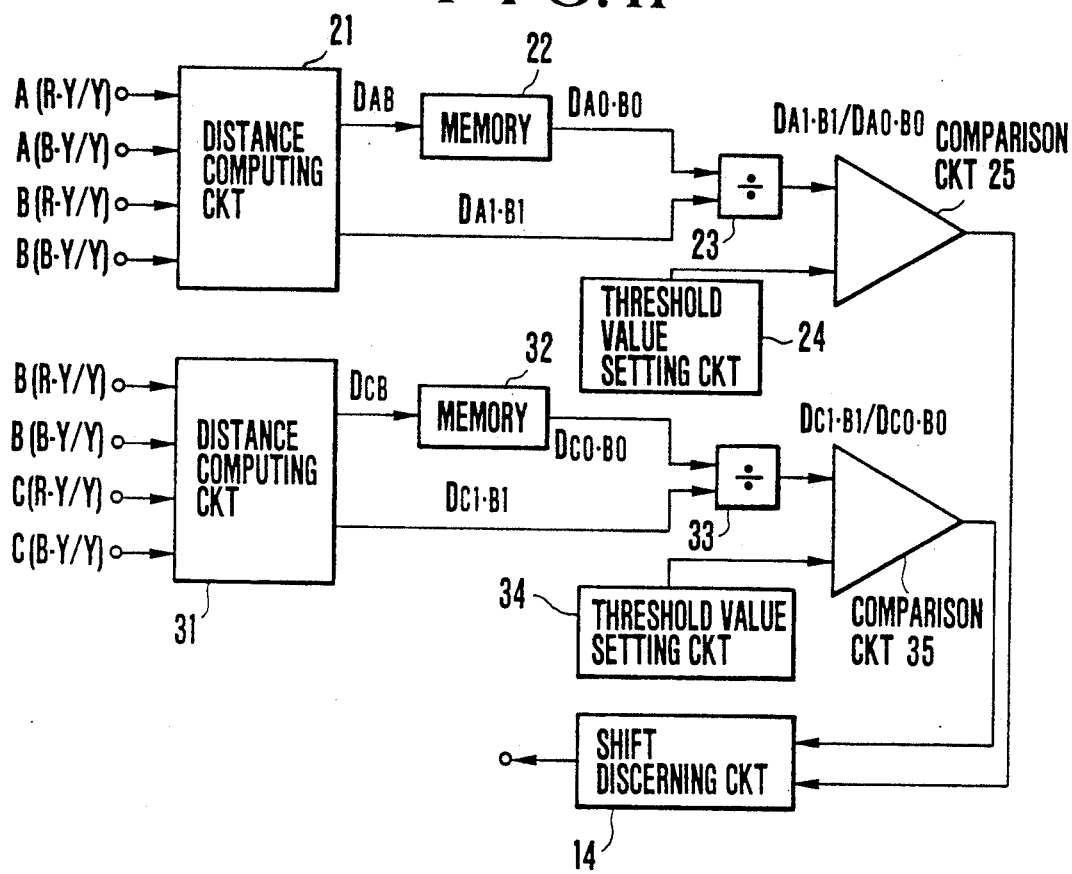
FIG. 11 is a block diagram showing an instance wherein the arrangement of FIG. 10 is applied to the device of FIG. 7.

The signals (R−Y/Y) and (B−Y/Y) which are obtained through the arrangement of FIG. 10 for each of the picture elements A, B and C are supplied to the distance computing circuits 21 and 31 of FIG. 7 in place of the signals (R−Y) and (B−Y) of the picture elements A, B and C as shown in FIG. 11. The follow-up operation is carried out on the basis of information thus normalized by luminance.

Figure 12:
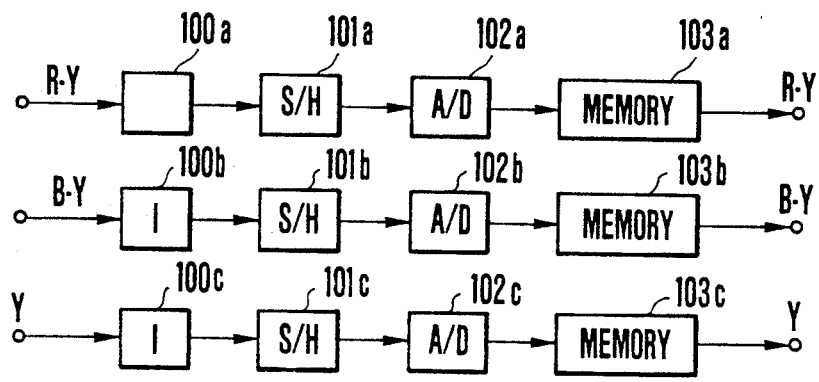
FIG. 12 is a block diagram showing a device arranged to process signals obtained from the picture elements of FIGS. 3A and 3B in carrying out a normalizing process by means of a distance computing circuit.

In the embodiment described above, the normalizing process is carried out by the circuit of FIG. 10. The outputs (R−Y/Y) and (B−Y/Y) thus obtained are processed by the distance computing circuits 21 and 31 which are shown in FIG. 11. Meanwhile, in a modification of this embodiment, the signals (R−Y), (B−Y) and Y are arranged to be obtained through integrating, sample-and-holding and A/D converting processes as shown in FIG. 12 and are then supplied to distance computing circuits 21' and 31' as shown in FIG. 13. Then, the normalizing process and the distance computation on the rectangular coordinate system of values (R−Y/Y) and (B−Y/Y) are carried out through the circuit arrangement shown in FIG. 13. In FIGS. 12 and 13, the circuits which are arranged in the same manner and to perform the same functions as those shown in FIGS. 4 and 7 are indicated by the same reference numerals as those shown in FIGS. 4 and 7. Further, the circuit arrangement shown in FIG. 12 includes an A/D conversion circuit 102c and a memory 103c which are provided for the signal Y.

In the embodiment described above, a shift in the position of the object is detected by means of two color difference signals (R−Y/Y) and (B−Y/Y). However, in case that the change of color signals from each of the picture elements representing the features of the object and the background takes place mostly in one of the above-stated two signals, the shift of the object position can be detected solely by one of the signals.

In cases where the luminance of an illumination light varies with time, the arrangement of the embodiment described above prevents each of the points on the coordinate system from coming closer to the origin O (when the light becomes darker) or from moving farther away from the origin O (when the light becomes brighter) while the object is not moving.

Embodiment IV

The device shown in FIGS. 2A-7 is arranged to operate on the basis of the result of a determining operation on the values DAn-Bn/DA0-B0 and DCn-Bn/DC0-B0 with the picture element B which is shown in FIG. 3A assumed virtually to be B0=B1=B2= - - - =Bn. Whereas, a fourth embodiment of this invention is arranged to be capable of performing accurate follow-up by detecting the position of a main object even in cases where the object moves at a relatively high speed relative to the device.

Figure 14:
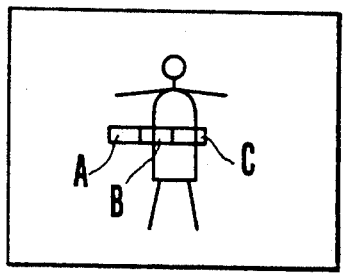
FIG. 14 is an illustration of a relation obtained between a follow-up field and the image of an object with the object moving further to the right than in the case of FIG. 3B.
Figure 15:
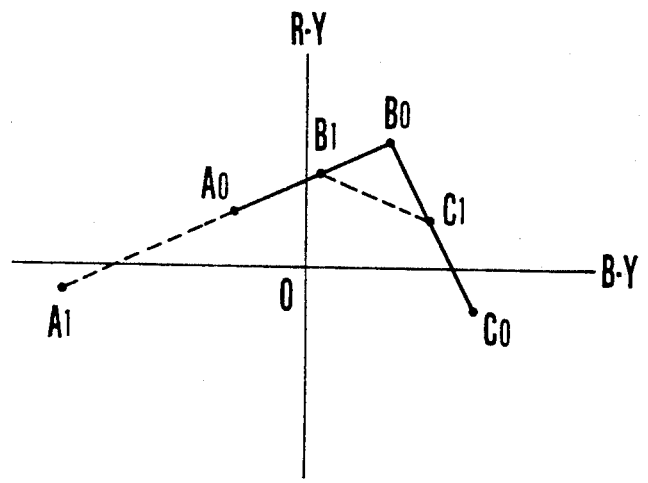
FIG. 15 is a graph showing by way of example signal obtained from the divided follow-up field of FIG. 14 as in a stage of plotted on a two dimentional plane.

In the event of a shift of the object at a relatively high speed, a point representing the picture element B becomes B1=B0 within a predetermined period of time which is, for example, one field period=1/60 sec. Further, in case that the color of a new background obtained by the shift is relatively close to the color of the object, there arises the following problem: Unlike the case of FIG. 3B, FIG. 14 shows a case where the position of the object has shifted to a great extent to the right within a period of 1/60 sec. FIG. 15 shows the shift of points representing the picture elements on the rectangular coordinate system of signals (R−Y) and (B−Y) after the shift of the object. As shown, the point B1 shifts its position from a point B0 toward a point A0. Assuming that a discerning threshold value is set at 2 in the same manner as in the case of the shift discerning circuit of FIG. 7, the values DA1-B1/DA0-B0 become about 1.5 in the case of FIG. 15. In this instance, therefore, the shift discerning circuit 14 does not produce the output "1". Thus, it sometimes becomes impossible to detect a shift of the object even when the object moves fast.

Figure 16:
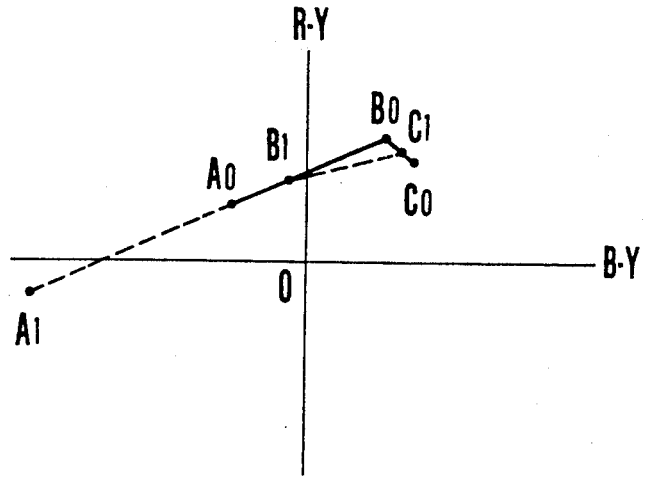
FIG. 16 shows another example of signals obtained from the divided fields.

FIG. 16 shows a more unfavorable case, wherein the positions of the picture elements B and C on the coordinate system are close to each other while those of the picture elements A and B are far away from each other. In this event, the value DA1-B1/DA0-B0 sometimes does not reach the threshold value 2 while, conversely, the value DC1-B1/DC0-B0 comes to exceed the threshold value 2. Under such a condition, the shifting direction of the object is sometimes judged to be moving in the direction reverse to the actual direction.

The fourth embodiment is arranged to solve the above-stated problem. The main feature of the embodiment resides in that a signal Bfix which represents a feature of the picture element B of the middle region at a specific point of time is employed as a follow-up reference instead of the signal obtained at the point Bn which varies every time the position of the middle picture element B on the coordinate system changes. Although the signal B0 which represents a feature of the picture element B obtained when an object is designated to be followed is preferably used as the signal Bfix, the signal Bfix is not limited to the signal B0. Therefore, a shift of the object is discerned on the basis of the value DAn-B0/DA0-B0 instead of the value DAn-Bn/DA0-B0 and on the basis of the value DCn-B0/DC0-B0 instead of DCn-Bn/DC0-B0. In the case of FIG. 15, the computed values of these values become DA1-B0/DA0-B0≈2.2 and DC1-B0/DC1-B0≈0.5. In the case of FIG. 16 they become DA1-B0/DA0-B0≈2.2 and DC1-B0/DC0-B0≈0.5. The results of judgement are correct in both cases.

Figure 17:
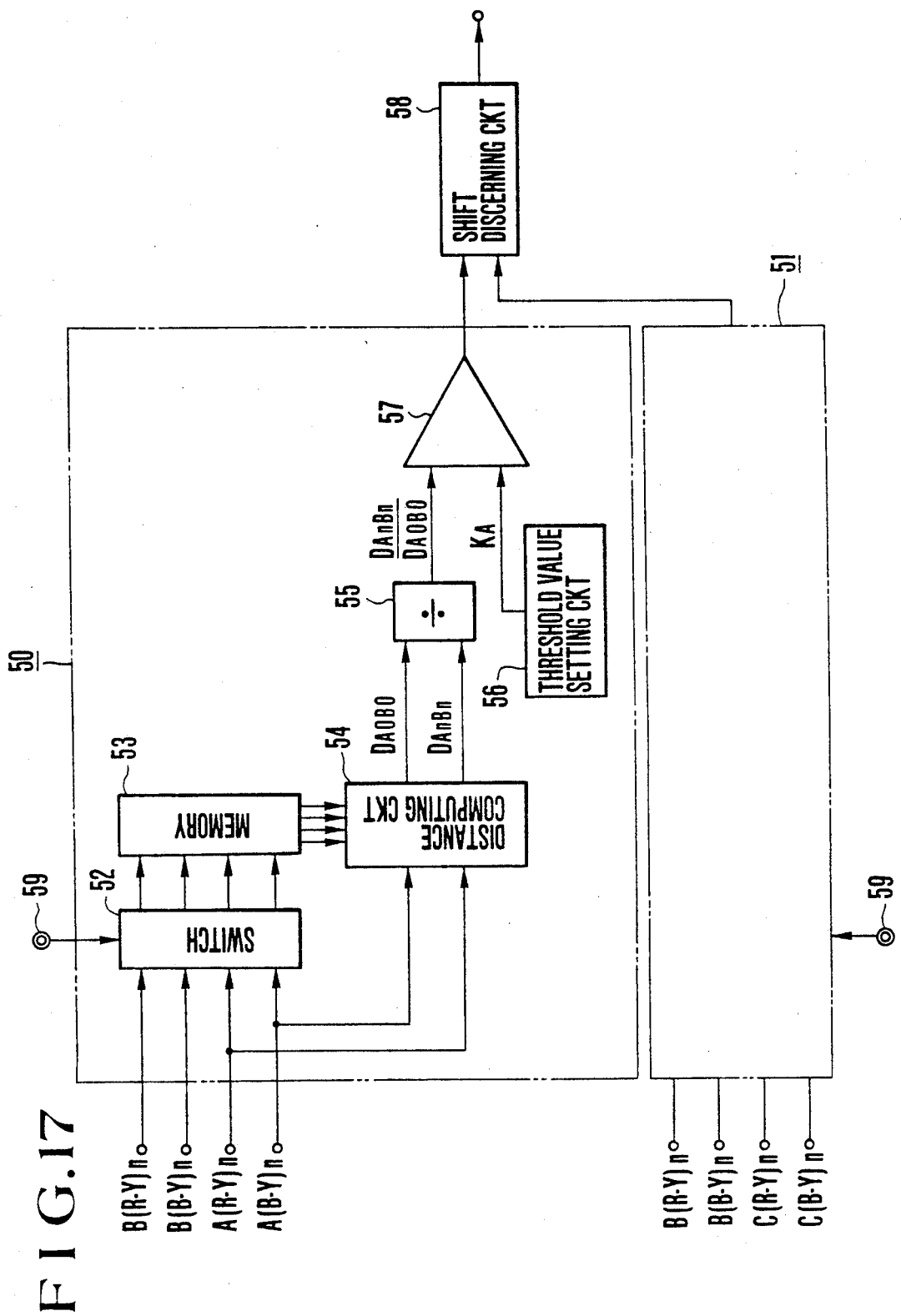
FIG. 17 is a block diagram showing the essential part of a fourth embodiment of this invention.

FIG. 17 shows the essential parts of the fourth embodiment of this invention in a circuit diagram. This circuit corresponds to the circuit shown in FIG. 7. The optical system and the control circuit which are omitted from FIG. 17 can be arranged in the same manner as in the embodiment shown in FIG. 6. Referring to FIG. 17, a comparison circuit arrangement 50 is arranged to compare the above-stated value DAn-B0/DA0-B0 with a threshold value KA. Another comparison circuit arrangement 51 is arranged to compare the above-stated value DCn-B0/DC0-B0 which another threshold value KC. The values of the points A and B representing the color features of the picture element A and B on the rectangular coordinate system of signals (R−Y) and (B−Y) are arranged to be applied to an input terminal 59. Upon receipt of an instruction for initial setting, a switch 52 turns on. Then, a value A0 for the picture element A and a value B0 for the picture element B are stored at a memory 53. Meanwhile, the points An and Bn are arranged to be obtained at every interval of approximately n/60 sec. after scanning of scanning lines. In this instance in which n=0, the value of the point An on the rectangular coordinate system of signals (R−Y) and (B−Y) is transferred to a distance computing circuit 54. The term "distance" as used here means a distance between two points on the coordinate system of signals (R−Y) and (B−Y). The computing circuit 54 thus receives information on the points A0, B0 and An (A1 in the cases of FIGS. 15 and 16). Then, the values DA0-B0 and DA1-B0 are respectively computed according to the following formulas:

$$DA0 - B0 = \sqrt{(A(R-Y)_0 - B(R-Y)_0)^2 + (A(B-Y)_0 - B(B-Y)_0)^2}$$

$$DA1 - B1 = \sqrt{(A(R-Y)_1 - B(R-Y)_0)^2 + (A(B-Y)_1 - B(B-Y)_0)^2}$$

Then, the divider 55 computes these values obtained from the distance computing circuit 54 to produce a value DAn-B0/DA0-B0. The value thus obtained is compared at the comparison circuit 57 with the threshold value KA which is set by a threshold setting circuit 56. In the event of a change exceeding the threshold value KA, the shift discerning circuit 58 produces the output "1" in the same manner as described in the foregoing. Another comparison circuit arrangement 51 also computes the value DCn-B0/DC0-B0 in the same manner as described above. Then, in the event of a change exceeding another threshold value KC, the shift discerning circuit 58 likewise produces the output "1". In the majority of cases, the switch 52 is turned on virtually at the same timing in both the comparators 50 and 51. Further, KA=KC.

With a shift of the object arranged to be judged on the basis of the values DAn-B0/DA0-B0 and DCn-B0/DC0-B0, the shift can be accurately discerned and the automatic follow-up can be accurately carried out even in cases where the object moves at a high speed relative to the follow-up device.

Embodiment V

In the automatic follow-up focus detecting operation described above, there arises the following problem: If the signals A0, B0 and C0 representing the color features of the picture elements, A, B and C remain in the initially set state without being renewed, when a change is brought about in color temperature by a change in the ambient conditions, the signal B which represents a color feature of the object on the rectangular coordinates (R−Y) and (B−Y) comes to vary even when there is no change in the positional relation between the object and the picture element B. In other words, the value DA1-B1 becomes larger than the value DA0-B0 and the value DB1-C1 larger than the value DB0-C0 when the ambient light becomes brighter to show a color difference more distinctively. In that event, a shift in the position of the object might erroneously be detected depending on which of the two ratios first comes to exceed the above-stated threshold value.

Figure 18:
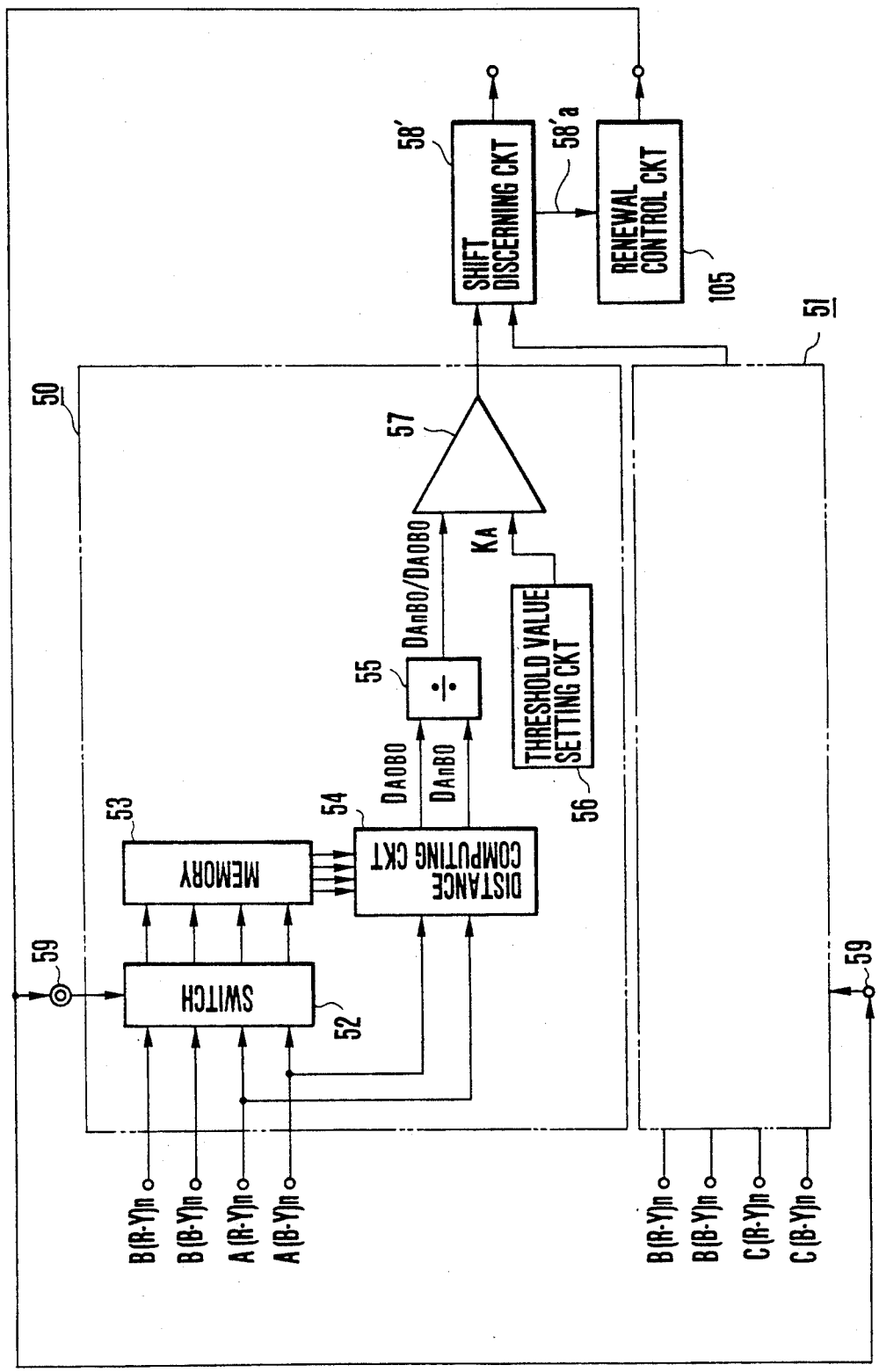
FIG. 18 is a block diagram showing a fifth embodiment of this invention which is arranged to perform a reference color automatic renewing function.

A fifth embodiment of this invention is arranged to solve this problem and to be capable of permitting highly accurate automatic follow-up without any error even under such a changing ambient condition as mentioned above. FIG. 18 shows this embodiment. In FIG. 18, the same reference numerals as those used in FIG. 17 denote the same circuit elements and numerals with dash marks denote circuits elements corresponding to those indicated by the numerals without dash marks in FIG. 17. In other words, a numeral 58' denotes a circuit corresponding to the shift discerning circuit 58 of FIG. 17. In this case, the circuit 58' is arranged to produce a predetermined signal from its output terminal 58'a when no shift of the object is detected in each cycle of discerning operation. The embodiment includes a renewal control circuit 105 which operates on the basis of the signal from the output terminal 58'a of the shift discerning circuit 58' and is arranged to apply a standard color renewal instruction to the input terminal 59 of the switch 52 in case that no shift of the object has consecutively been detected a predetermined number of times (or cycles) or an "n" number of times. The renewal control circuit 105 is provided with a counter.

Figure 19:
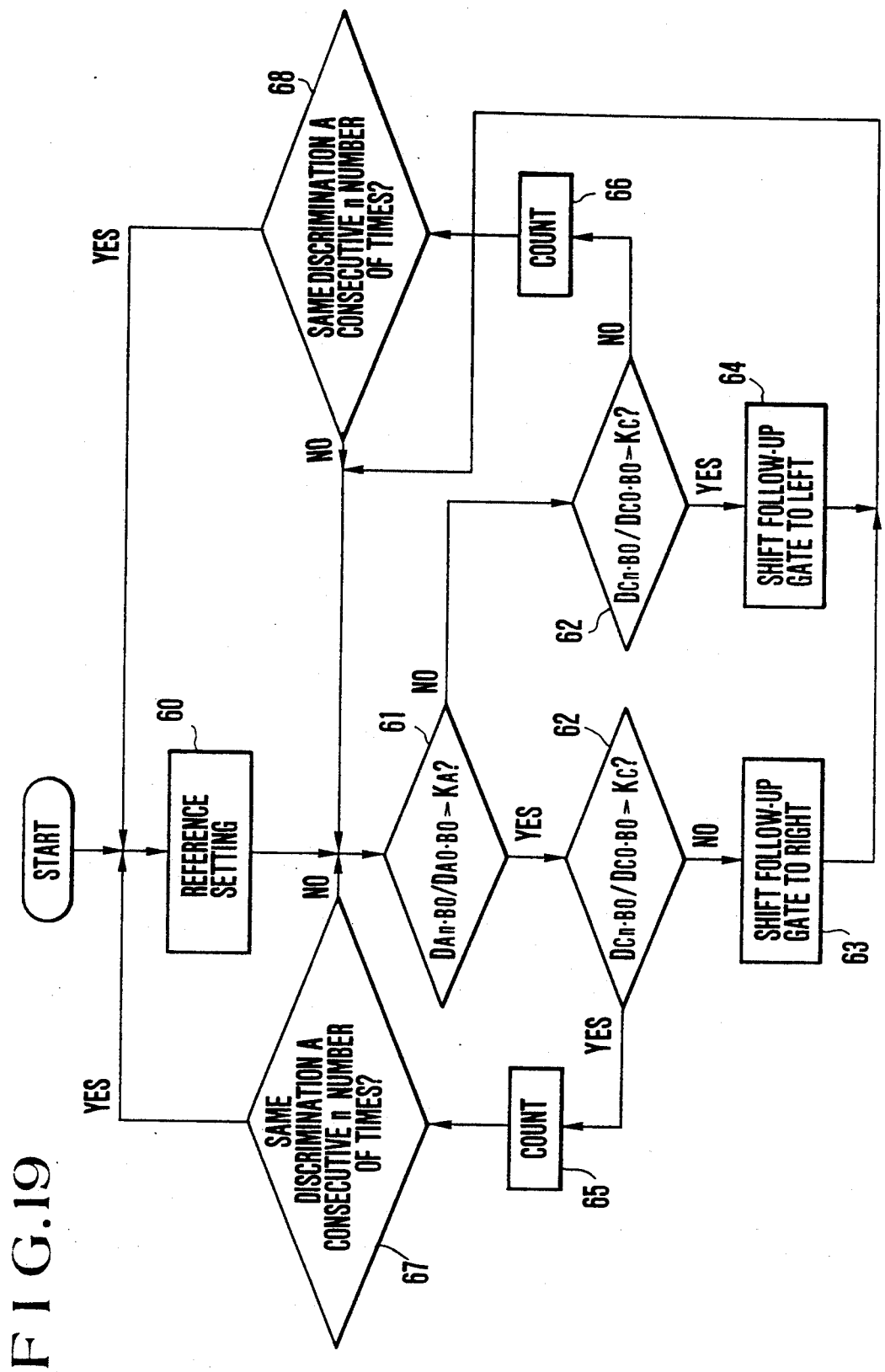
FIG. 19 is a flow chart showing the reference color automatic renewing operation of the device shown in FIG. 18 as the fifth embodiment of the invention.

Referring to FIG. 19, the reference color automatic renewing operation of the device shown in FIG. 18 is as follows: When a follow-up action is caused to begin by commencement of a photographing operation or under a stand-by condition, reference setting is carried out for each of points A0, B0 and C0 at a step 60. This setting operation is performed with the switch 52 turned on by the instruction from the control circuit 105 and with the color features of the picture elements A, B, and C stored at the memory 53. Steps 61 and 62 show the manner in which the shift discerning circuit 58' forms a judgement or makes a discrimination. If the result of the discrimination is "YES at the step 61 and NO at the step 62" or is "NO at the step 61 and YES at the step 62", it indicates that the object has actually moved. In that event, the follow-up field is shifted in the applicable direction at a step 63 or 64. During the shift of the object, the set reference values of the points A0, B0 and C0 are not renewed. In case of the result of discrimination which is "YES at the step 61 and also YES at the step 62" or "NO at the step 61 and also NO at the step 62", it indicates either that the object is in repose or that the shift of the object is undiscernible. This discriminating action is preferably performed at every period of 1/60 sec. In the latter case of discrimination, the number of times for which the latter discrimination is consecutively repeated is counted (at steps 65 and 66). In that event, the above-stated count is cleared when a discrimination of "YES and NO" or "NO and YES" is made once after the "NO and NO" or "YES and YES" discrimination has been consecutively repeated an "m" number of times. At steps 67 and 68, it is determined whether the counted values of counters have exceeded a predetermined number "n" (n>m). In case that the discrimination "NO and NO" or "YES and YES" has been consecutively made more than the "n" number of times, a signal indicative of this fact is supplied from the control circuit 105 to the switch 52 via the terminal 59. Upon receipt of this signal, the values of the points A0, B0 and C0 are renewed, that is, reference colors are renewed at the step 60. Assuming that the shift discerning circuit 58' is arranged to make a discriminating action at intervals of 1/60 sec., and that the "n" number is 5, the reference colors are renewed when the object remains still for a period of 1/12 sec.

Accordingly, with the reference color renewing means added in this manner, the storage contents of the storing means which is arranged to store the feature of the object (the memory 53 in the case of FIG. 18) can be renewed. This arrangement effectively prevents erroneous discernment of a shift of the object due to a change in the ambient conditions, so that follow-up can be carried out at a high degree of precision.

Embodiment VI

Figure 20A:
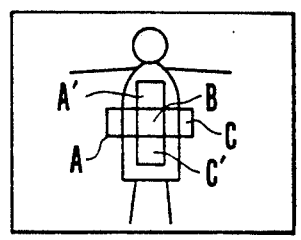
FIG. 20A is an illustration of a relation between an object and the follow-up field of a sixth embodiment of this invention in which the follow-up field is divided into picture elements extending both in horizontal and vertical directions.
Figure 20B:
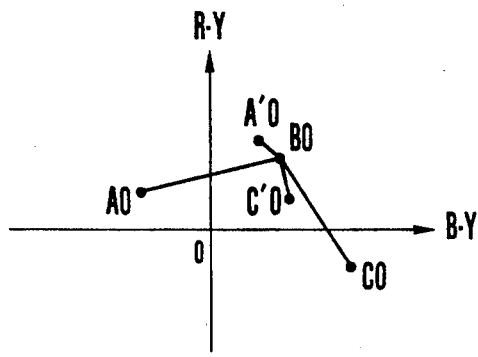
FIG. 20B shows signals obtained from the picture elements of the embodiment shown in FIG. 20A as in a state of plotted on a two dimensional plane.

The foregoing embodiments of this invention are arranged to detect one dimensional shift of the object position, i.e. a shift in the horizontal direction. In order to adequately cover a two dimensional shift of the object, it is preferable to have a follow-up field arranged to extend both in horizontal and vertical directions as shown in FIG. 20A. Referring to FIG. 20A, picture elements A, B and C are arranged to extend in the horizontal direction in the same manner as in the case of FIG. 3A. In the case of a sixth embodiment, however, the follow-up field further includes picture elements A' and C' which are arranged to vertically extend from the middle picture element B. For simplification's sake, let us assume that a person which is a main photo-taking object is wearing a single color dress while the color of the background portion covered by the region or picture element A differs from that of another background portion covered by the picture element C. FIG. 20B shows the color features of these picture elements A, B, C, A' and C' as expressed on rectangular coordinate axes $(R-Y)$ and $(B-Y)$. The color features of the picture elements A' and C' differ from each other to a slight degree under the influence of light and shadows as the dress of the object is of a single color. However, compared with the picture elements A and C which are under the influence of the background, the picture elements A' and C' are plotted closer to a point B. In cases where the object or the camera is moving only in the horizontal direction, changes take place substantially in the same manner as in the case of FIG. 3B. However, in the event of a movement of the object or the camera in the vertical or oblique direction, the positions of the picture elements A' and C' on the plane of axes $(R-Y)$ and $(B-Y)$ vary to a great degree as the background comes to enter these picture elements A' and C'.

With the follow-up field arranged to extend both in the vertical and horizontal directions as shown in FIGS. 20A and 20B, the relative shift between the object and the camera is detected in the following manner: In addition to a first shift detecting system arranged as shown in FIG. 6, there are provided another shift detecting system. The former is used for detecting a shift in the horizontal direction and the latter for detecting a shift in the vertical direction. The outputs of a total of four comparison circuits for these two shift detecting systems are arranged to be supplied to a common shift discerning circuit, such as the circuit 14 of FIG. 7. When, for example, the shift discerning circuit receives information from the first shift detecting system about a shift in the leftward direction and information from another about an upward shift, the circuit determines that the object has moved in the left upward direction within a picture plane relative to the camera.

Embodiment VII

Figure 21:
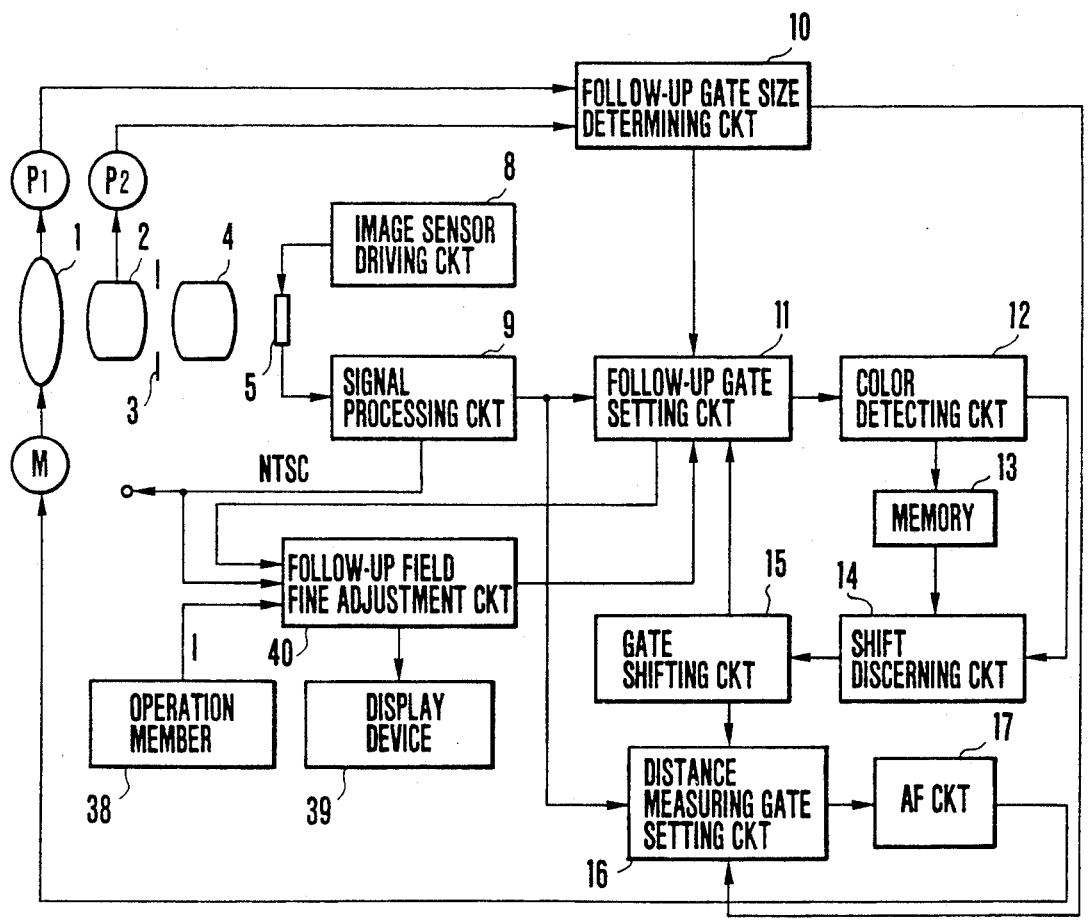
FIG. 21 is a block diagram showing, like in FIG. 6, a combination of an optical system and an electrical control system arranged as a seventh embodiment of this invention.

A seventh embodiment of this invention is arranged to permit fine adjustment of the follow-up field described in the foregoing. Referring to FIG. 21, the embodiment includes a follow-up field fine adjustment circuit 40. As will be further described with reference to FIG. 26 later herein, the circuit 40 is arranged to effect fine adjustment of the size of the follow-up field by controlling a follow-up gate setting circuit 11 in accordance with an input I from a manual operation member 38. The circuit 40 forms a signal indicative of the size of the finely adjusted follow-up field and combines it with an incoming NTSC signal. A composite signal thus obtained is arranged to be displayed at a display device 39 of an electronic view finder (EVF) or the like. The rest of the arrangement of this embodiment is similar to the arrangement of the embodiment shown in FIG. 6. Further, the shift discerning or determining part of this embodiment is arranged in the same manner as in the case of FIG. 7.

Figure 22A:
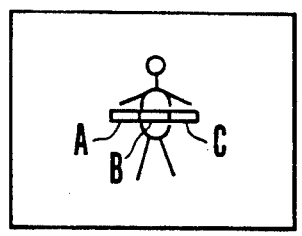
FIG. 22A shows a case where only one picture element is covering a follow-up object within a follow-up field.
Figure 22B:
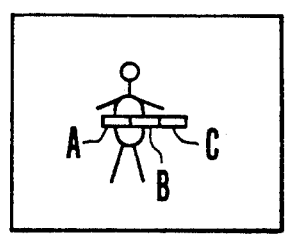
FIG. 22B shows another case where the object has moved to a different position within a picture plane shown in FIG. 22A.
Figure 23:
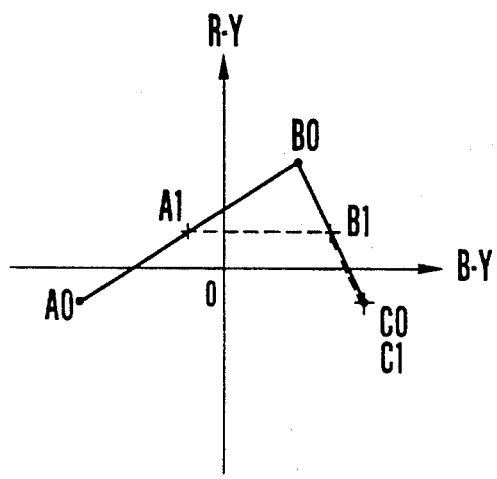
FIG. 23 shows signals obtained from the picture elements shown in FIGS. 22A and 22B as in a state of plotted on a two dimensional plane.

In the case of FIG. 3A, the relation between the follow-up field and the object is arranged on the assumption that a boundary line between the left background and and the object is approximately in the middle part of the picture element A and a boundary line between the right background and the object approximately in the middle part of the picture element C when the device is in its registering mode. Deviation from this condition might make shift discernment impossible in an ensuing comparison mode. The reason for this is as described below with reference to FIGS. 22A, 22B to FIG. 26:

FIG. 22A shows a case where the object which is being followed up is registered in a state of being covered solely by the picture element B. In this instance, assuming that the outputs of picture elements A, B, and C are A0, B0 and C0, these outputs are expressed, for example, on a coordinate system $(R-Y)$ and $(B-Y)$ as shown in FIG. 23. Next, assuming that the object being followed up shifts its position to the left within the picture plane as shown in FIG. 22B, the positions of outputs A1, B1 and C1 then become, for example, as shown in FIG. 23. Under this condition, values DA1-B1/A0-B0 and DC1-B1/C0-B0 becomes as shown below:

DA1-D1/A0-B0=0.6,
DC1-B1/C0-B0=0.5

Figure 24A:
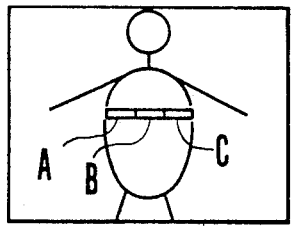
FIG. 24A shows a case where all the picture elements within a follow-up field are covering a follow-up object.
Figure 24B:
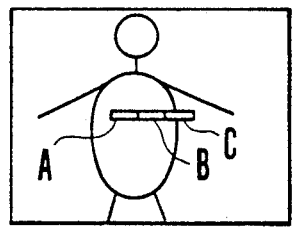
FIG. 24B shows another case where the object has moved to a different position within a picture plane shown in FIG. 24A.
Figure 25:
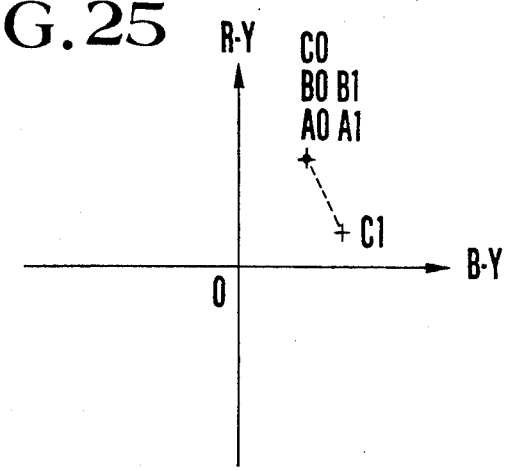
FIG. 25 shows signals obtained from the picture elements shown in FIGS. 24A and 24B as in a state of plotted on a two dimensional plane.

Therefore, in this instance, both the comparison circuits 25 and 35 of FIG. 7 produce an output "0" and it becomes impossible to detect the shift of the object by the arrangement of FIG. 7 alone. FIG. 24A shows another instance where the object to be followed up is covered by all the picture elements A, B and C and is registered in that state. Assuming that the outputs of these picture elements are A0, B0 and C0, they are expressed, for example, on a coordinate system $(R-Y)$ and $(B-Y)$ as shown in FIG. 25. When the object moves to the left relative to the picture elements within the same picture plane as shown in FIG. 24B, the positions of outputs A1, B1 and C1 of the picture elements become as shown in FIG. 25. Under this condition, the values DA1-B1/A0-B0 and DC1-B1/C0-B0 become as shown below:

DA1-B1/A0-B0=0/0=indefinite
DC1-B1/C0-B0=n/0= $\infty$ (wherein "n" represents a number.)

Then, the comparison circuit 35 produces an output "1". However, since the output of another comparison circuit 25 is indefinite, the shift discerning circuit sometimes correctly determines the object to have moved to the left relative to the device but sometimes incorrectly determines it to have moved in the reverse direction. Further, since the denominators of both the values DA1-B1/A0-B0 and DC1-B1/C0-B0 are close to zero, the outputs of the comparison circuits 25 and 35 become unstable and thus tend to result in an unstable follow-up operation.

Figure 26:
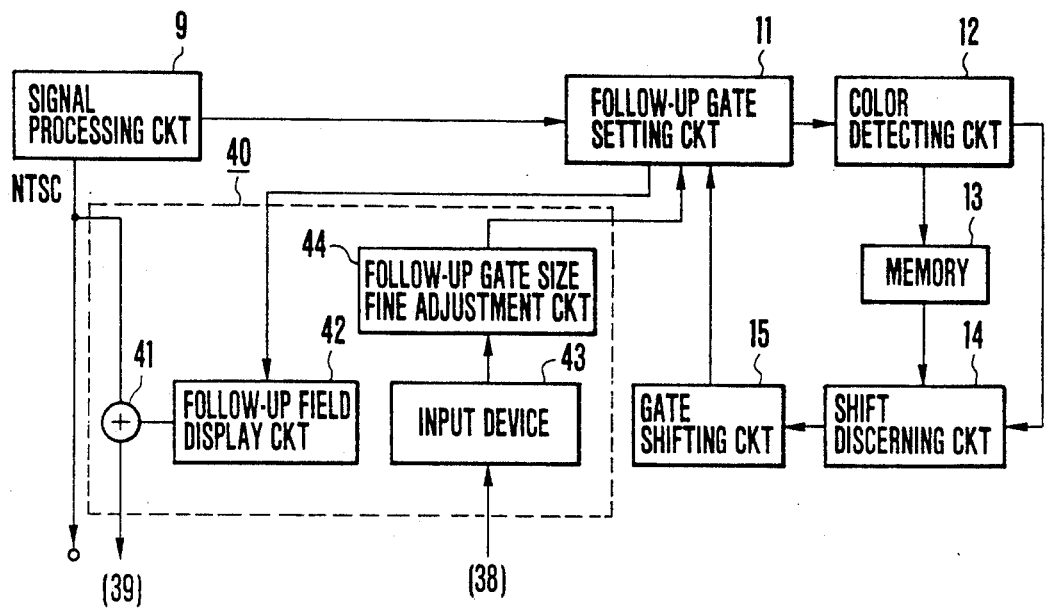
FIG. 26 is a block diagram showing the details of a fine adjustment part arranged for the follow-up field of the device of FIG. 21, the illustration showing the details together with related parts.

To solve these problems, the seventh embodiment is provided with a follow-up field fine adjustment circuit 40 and is arranged to permit manual setting of the size of the follow-up field at the time of a registering process. FIG. 26 shows the details of the seventh embodiment.

Referring to FIG. 26, the follow-up field fine adjustment circuit 40 includes a combiner 41; a follow-up field display circuit 42; and input device 43; and a follow-up gate size fine adjustment circuit 44 which are interconnected as shown in the drawing. Other parts which are indicated by the same reference numerals as those used in FIGS. 6 and 26 are arranged and function in the same manner as the corresponding parts shown in FIGS. 6 and 26.

In a follow-up object registering mode, a follow-up field is set in a standard size (a little larger than the body of the object in this case) by the follow-up gate setting circuit 11. A display signal of a size corresponding to the set size of the follow-up field is formed by the follow-up field display circuit 42. This display signal is combined with an NTSC signal by the combiner 41 into a composite signal. This composite signal is displayed at the display device 39 of an electronic view finder or the like. The photographer then confirms that the follow-up field is of a size suited for the object to be followed up (see FIG. 3A). If it is too small or too large for the object as shown in FIG. 22A or FIG. 24A, the manual operation member 38 is operated to have a signal for increasing or decreasing the size of the follow-up field supplied from the input device 43 to the follow-up gate size fine adjustment circuit 44. Upon receipt of this signal, the follow-up gate size fine adjustment circuit 44 supplies the follow-up gate setting circuit 11 with a signal for causing fine adjustment of the follow-up field to be effected. Then, in response to this signal, the follow-up gate setting circuit 11 sets the size of the follow-up field. Then, the adjusted follow-up field is again displayed at the display device via the follow-up field display circuit 42 and the combiner 41. The photographer observes it and repeats the fine adjustment until the size of the follow-up field becomes apposite to the object to be followed up. Upon completion of the fine adjustment, the object is registered and the device enters into a follow-up mode.

The arrangement of this embodiment thus permits the follow-up field to be set in a size best suited to each of varied sizes of objects to be followed up.

Embodiment VIII

Figures 27A, 27B:
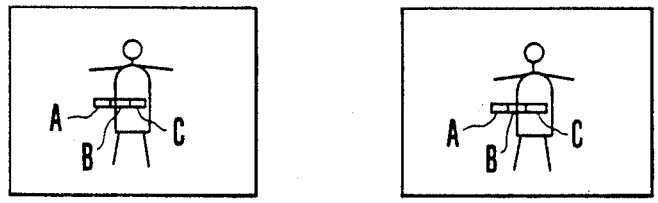
FIG. 27A shows a relation between a follow-up field and an object in a condition where two of the picture elements within the follow-up field are not covering the background of a scene.
FIG. 27B shows the same picture plane as FIG. 27A as in a condition having the object shifted its position therein.
Figure 28:
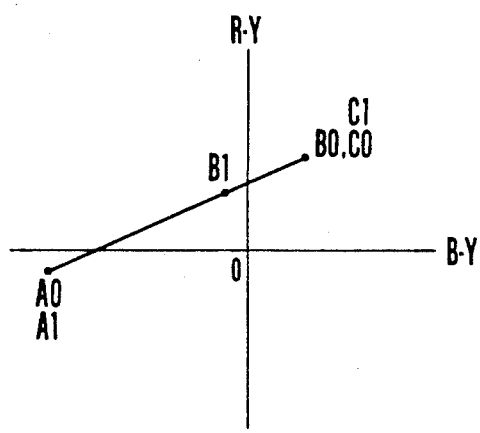
FIG. 28 shows signals obtained from the picture elements shown in FIGS. 27A and 27B as in a state of plotted on a two dimensional plane.

The arrangement of the embodiment described above might result in a misjudgement of a shift of the object during the process of the comparison mode ensuing the registering mode, depending on the condition under which the position of the follow-up field is adjusted to the follow-up object during the process of the registering mode. For example, let us assume that the feature of the follow-up object is registered under a condition having no signal of the background entering the picture elements B and C as shown in FIG. 27A. Under this condition, signals from the picture elements can be plotted on a rectangular coordinate system $(R-Y)$ and $(B-Y)$ as indicated by points A0, B0 and C0 in FIG. 28. After that, if the object shifts to the right relative to the picture elements or the device as shown in FIG. 27B, the signals from the picture elements can be plotted as indicated by points A1, B1 and C1 in FIG. 28. In this instance, the values DA1-B1/DA0-B0 and DC1-B1/DC0-B0 become as shown below:

DA1-B1/DA0-B0=0.67,
DC1-B1/DC0-B0=∞

Therefore, in the circuit arrangement shown in FIG. 7, the comparison circuit 35 produces an output "1"; and the shift discerning circuit 14 produces a signal for quickening the gate setting timing by a predetermined length of time. As a result of that, the follow-up field is shifted in the direction reverse to the object to be followed up.

Figure 29:
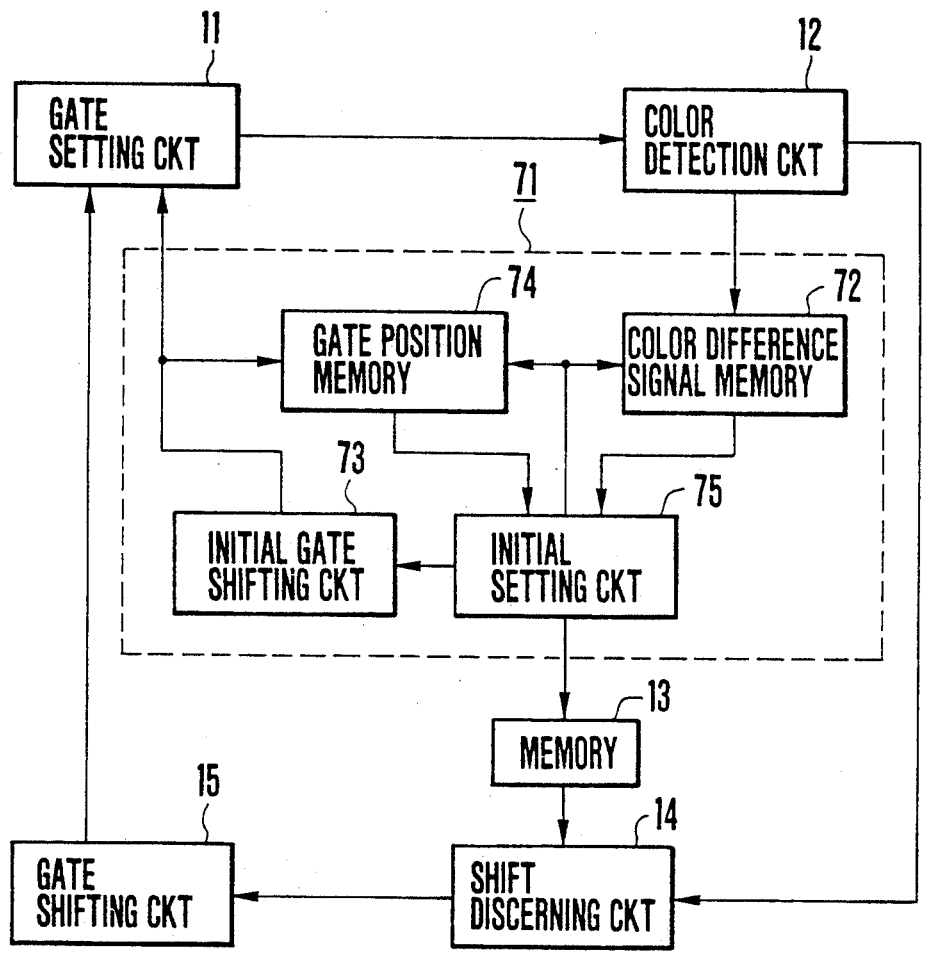
FIG. 29 is a block diagram showing the essential parts of an eighth embodiment of this invention.

To solve this problem, an eighth embodiment of this invention is arranged as follows: Before the feature of the object is registered, the follow-up field is shifted to a slight extent until either the whole of or a part of the follow-up field is stably set within the image of the object. FIG. 29 shows the circuit arrangement of this embodiment. In this embodiment, the feature of the object is registered after confirmation of the stabilization of the middle picture element B within the image of the object to be followed up. With respect to what part of the follow-up field is to be used for the confirmation of the above-stated condition, it may be determined according as required by design work.

Compared with the device shown in FIG. 6, the device shown in FIG. 29 differs in the additional provision of a positioning circuit 71. In FIG. 29, the parts which are arranged to perform basically the same functions as the corresponding parts of FIG. 6 are indicated by the same reference numerals. Meanwhile, the overall arrangement of this embodiment is basically the same as that of the embodiment shown in FIG. 6 and, therefore, is omitted from the illustration in FIG. 29. As shown, the positioning circuit 71 includes a color difference signal memory 72, an initial gate shifting circuit 73, a gate position memory 74 and an initial setting circuit 75.

Figure 30A:
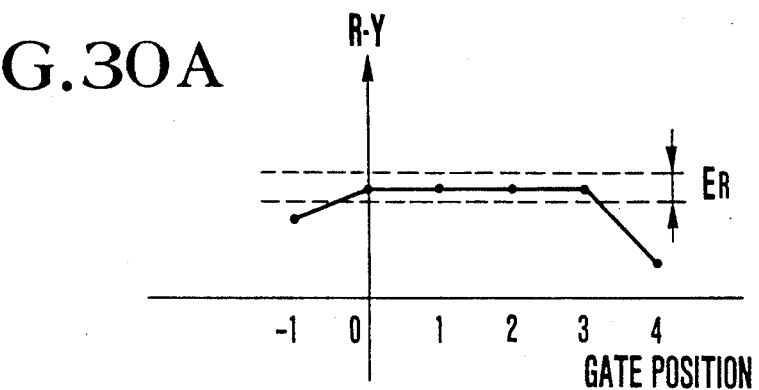
FIGS. 30A and 30B show variations of signals $(R-X)$ and $(B-Y)$ relative to their gate positions in the device shown in FIG. 29.
Figure 30B:
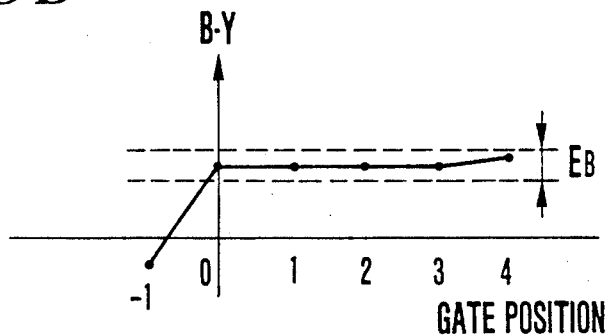
Figure 30C:
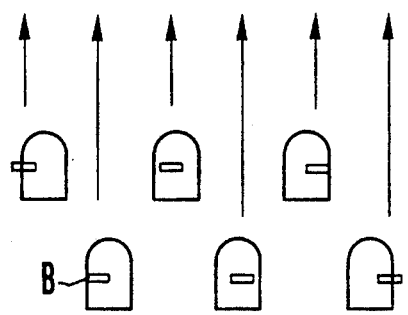
FIG. 30C shows the positions of an image of an object corresponding to the signal variations shown in FIGS. 30A and 30B in relation to one of picture elements within a follow-up field.

Referring now to FIGS. 30A, 30B and 30C, the operation of this embodiment in its registering mode is as follows: FIGS. 30A and 30B show the variations of signals $(R-Y)$ and $(B-Y)$ relative to gate positions which arise when the relative positions between the object and the above-stated picture element B are as shown in FIG. 30C. Assuming that a gate position is "0" when the relative position between the picture element B and the object is as shown in FIG. 27A. Under this condition, a registering mode is initiated by a manual setting operation on a switch or the like which is not shown. First, information on the gate position "0" shown in FIG. 30A is stored at the gate position memory 74. Then, color difference signals $(R-Y)$ and $(B-Y)$ of values shown in FIG. 30A are stored at the color difference signal memory 72. The initial gate shifting circuit 73 then shifts the position of the picture element B to the left as viwed on FIG. 27A to a predetermined extent, for example, as much as ⅓ of the length of the picture element. Information on a gate position "−1" which is thus obtained then is once stored at the gate position memory 74. At the same time, the color difference signals $(R-Y)$ and $(B-Y)$ are stored at the color difference signal memory 72. The initial setting circuit 75 then compares the color difference signals obtained at the time of the gate position "−1" with the color difference signals obtained at the time of the gate position "0". In this instance, both the signals $(R-Y)$ and $(B-Y)$ have changed to an extent exceeding predetermined threshold values (or dead bands) ER and EB. The picture element B is regarded as having deviated from the object and processed when any one of the color difference signals (R−Y) and (B−Y) has changed to an extent exceeding the applicable threshold value. In the event of changes in the two color difference signals to an extent exceeding these threshold values with the gate position shifted from "0" to "−1", the stored value within the gate position memory 74 for the gate positions "−1" and "0" and the stored value within the color difference signal memory 72 for the gate position "−1" are cleared respectively.

Next, the initial gate shifting circuit 73 shifts the position of the picture element B for the gate position "0" in the reverse direction, i.e. to the right as viewed on FIG. 27A to a predetermined extent which is, for example, ⅓ of the length of the picture element to obtain a gate position "1". With the gate position thus changed to "1", the same process and comparison are carried out as in the above-stated instance. In this instance, both the color difference signals (R−Y) and (B−Y) do not change to any extent that exceeds the threshold values. With both the signals not changing to any extent exceeding the threshold values, the picture element B is regarded as staying within the image of the object. In this case, a value obtained by subtracting 1 from the stored value of the gate position memory 74, i.e. "0", is stored at the gate position memory 74. Meanwhile, the stored value of the color difference signal memory 72 for the gate position "1" is cleared. Then, the same operation as described above is also performed for another gate positions. When it comes to the gate position "4", if the color difference signal (R−Y) alone changes to an extent exceeding the threshold value, the picture element B is considered to have deviated from the image of the object. In that instance, a value obtained by subtracting 1 from the stored value of the gate position memory 74, that is, "3" is stored at the memory 74. Meanwhile, the stored value of the color difference signal memory for the gate position "4" is cleared.

As a result of the above-stated processes, the values "0" and "3" are stored at the gate memory 74. Then, on the basis of these stored values, intermediate values between these stored values, such as "1" and "5" are given to the initial setting circuit 73. At the same time, the stored value of the color difference signal memory 72, i.e. the signals (R−Y) and (B−Y) for the gate position "0", is applied to the memory 13. With the picture element B thus having been stably set within the image of the object, a registering operation comes to an end (an input to the memory 13, in this specific example). Thus, in the embodiment described, the gate or the follow-up field is shifted to a slight extent and confirmation of a condition in which either the whole or a part of the follow-up field has settled within the image of the object is made before a feature of the object is registered as a reference value for use in the operation in the ensuing comparison mode. Therefore, this arrangement ensures stable and accurate follow-up. Further, the discrimination as to whether the picture element of the follow-up field has deviated from the image of the object is arranged to be accomplished through comparison with the threshold value, that is, with a dead band provided for the discrimination. Therefore, this arrangement precludes the possibility of erroneous positioning even in cases where the color difference signals which represent the features of the object vary only to a slight degree.

While preferred embodiments have been described in the foregoing, this invention is of course not limited to these examples. Many and various changes and modifications may be made in the invention without departing from the spirit and scope thereof. Further, this invention is applicable not only to video cameras but also to a wide range of other apparatuses that are arranged to perform a follow-up action on a moving object.

What is claimed is:

1. An automatic follow-up focus detecting device comprising:

means for shiftably setting a follow-up field;

extracting means for extracting a feature of an object in relation to the follow-up field;

storing means for storing said extracted feature;

detecting means for detecting a relative shift between said object and the device on the basis of the feature of said object newly extracted by said extracting means and the feature stored by said storing means; and shifting means for shifting a distance measuring field following said object according to said relative shift between said object and the device.

2. A video camera, comprising:

(A) a photographing optical system for photographing an object and for focusing an image of the object on an image sensing plane;

(B) image sensing means for converting the image of the object on said image sensing plane into an image sensing signal;

(C) area setting means for setting a detecting area for extracting a feature of said image of the object on said image sensing plane;

(D) detecting means for detecting the feature of said image from said image sensing signal corresponding to said detecting area, and for putting out corresponding signals;

(E) first control means for detecting a variation of said image of the object on the basis of an output of said detecting means and for controlling said area setting means so that said detecting area follows the variation of said image of the object; and (F) second control means for varying a size of said detecting area in response to a focal length of said photographing optical system.

3. A video camera according to claim 2, wherein said detecting means detects a color signal component in said image sensing signal.

4. A video camera according to claim 2, wherein said detecting means includes normalizing means for effecting normalization on the basis of a luminance, in order to prevent the signal representing the feature of the image extracted from said image sensing signal from being subjected to an influence of a brightness.

5. A video camera according to claim 1, wherein said first control means is arranged to detect a shift of said image by comparing the output of said detecting means at different timings.

6. A video camera according to claim 5, and further comprising integrating means for integrating the outputs of said detecting means, wherein said first control means is arranged to detect the shift of the image by comparing the signals smoothed by said integrating means.

7. A video camera according to claim 2, wherein said detecting area is a focus detecting area.

8. A video camera, comprising:

(A) a photographing optical system for photographing an object and for focusing an image of the object on an image sensing plane;

(B) image sensing means for converting the image of the object on said image sensing plane into an image sensing signal;

(C) area setting means for setting a detecting area for extracting a feature of said image of the object on said image sensing plane;

(D) detecting means for detecting the feature of said image from said image sensing signal corresponding to said detecting area, and for producing outputs;

(E) first control means for detecting a variation of said image of the object on the basis of an output of said detecting means and for controlling said area setting means so that said detecting area follows the variation of said image of the object; and (F) second control means for varying a size of said detecting area in response to a distance between said object and the video camera body.

9. A video camera according to claim 8, wherein said detecting means includes normalizing means for effecting normalizing on the basis of a luminance, in order to prevent the signal representing the feature of the image extracted from said image sensing signal from being subjected to an influence of a brightness.

10. A video camera according to claim 8, wherein said first control means is arranged to detect a shift of said image by comparing the outputs of said detecting means at different timings.

11. A video camera, comprising:

(A) image sensing means for converting the image of the object on said image sensing plane into an image sensing signal;

(B) area setting means for setting a detecting area for extracting a feature of said image of the object on said image sensing plane;

(C) detecting means for detecting the feature of said image from said image sensing signal corresponding to said detecting area, and for producing an output;

(D) control means for detecting a variation of said image of the object on the basis of an output of said detecting means and for controlling said area setting means so that said detecting area follows the variation of said image of the object; and (E) adjusting means for manually varying a size of said detecting area.

12. A video camera according to claim 11, wherein said control means includes a memory for storing the output of said detecting means and it is arranged to detect a shift of said image by comparing the output of said detecting means at different timings.

13. A video camera according to claim 11, wherein said detecting means includes normalizing means for effecting normalization on the basis of a luminance in order to prevent the signal representing the feature of the image extracted from said image sensing signal from being subjected to an influence of a brightness.

14. A video camera, comprising:

(A) area setting means for setting a detecting area for detecting a feature of an image in a picture plane;

(B) detecting means for detecting the feature of said image in said detecting area from the image signal;

(C) control means for detecting a variation of said image on the basis of an output of said detecting means and for controlling said area setting means so that said detecting area follows the variation of said image when the variation of said image comes beyond a predetermined threshold value; and (D) means for varying said threshold value.

15. A video camera according to claim 14, wherein said threshold value determines a non-sensitive band for the shift of said detecting area.

16. A video camera according to claim 14, wherein said detecting area is a focus detecting area.

* * * * *